US012392887B2

(12) United States Patent
Jales et al.

(10) Patent No.: US 12,392,887 B2
(45) Date of Patent: Aug. 19, 2025

(54) ENHANCED DOPPLER RADAR SYSTEMS AND METHODS

(71) Applicant: Raymarine UK Limited, Fareham (GB)

(72) Inventors: Richard James Jales, Eastleigh (GB); Philip Webb, Fareham (GB)

(73) Assignee: Raymarine UK Limited, Fareham (GB)

(*) Notice: Subject to any disclaimer, the term of this patent is extended or adjusted under 35 U.S.C. 154(b) by 156 days.

(21) Appl. No.: 18/166,424

(22) Filed: Feb. 8, 2023

(65) Prior Publication Data

US 2023/0184923 A1 Jun. 15, 2023

Related U.S. Application Data

(63) Continuation of application No. PCT/US2021/048564, filed on Aug. 31, 2021, and a
(Continued)

(51) Int. Cl.
*G01S 13/86* (2006.01)
*G01C 21/20* (2006.01)
(Continued)

(52) U.S. Cl.
CPC .......... *G01S 13/862* (2013.01); *G01C 21/203* (2013.01); *G01S 13/582* (2013.01);
(Continued)

(58) Field of Classification Search
None
See application file for complete search history.

(56) References Cited

U.S. PATENT DOCUMENTS

| 3,893,123 A | 7/1975 | Bieser |
| 6,754,584 B2 | 6/2004 | Pinto et al. |

(Continued)

FOREIGN PATENT DOCUMENTS

| CN | 201266086 Y | 7/2009 |
| CN | 106772493 A | 5/2017 |

(Continued)

OTHER PUBLICATIONS

"How to Choose the Best Heading Method?" Oct. 24, 2022, SBG Systems, https://www.sbg-systems.com/support/technology/choose-best-heading-method/.
(Continued)

*Primary Examiner* — Whitney Moore
(74) *Attorney, Agent, or Firm* — Haynes and Boone, LLP

(57) ABSTRACT

Techniques are disclosed for systems and methods to provide remote sensing imagery for mobile structures. A remote sensing imagery system includes a radar assembly mounted to a mobile structure and a coupled logic device. The radar assembly includes an orientation and position sensor (OPS) coupled to or within the radar assembly and configured to provide orientation and position data associated with the radar assembly. The logic device is configured to receive radar returns corresponding to a detected target from the radar assembly and orientation and/or position data corresponding to the radar returns from the OPS, determine a target radial speed corresponding to the detected target, and then generate remote sensor image data based on the remote sensor returns and the target radial speed. Subsequent user input and/or the sensor data may be used to adjust a steering actuator, a propulsion system thrust, and/or other operational systems of the mobile structure.

20 Claims, 10 Drawing Sheets

Related U.S. Application Data continuation-in-part of application No. 17/025,864, filed on Sep. 18, 2020, now Pat. No. 12,066,519, which is a continuation of application No. PCT/US2019/027101, filed on Apr. 11, 2019.

(60) Provisional application No. 63/072,915, filed on Aug. 31, 2020, provisional application No. 62/656,874, filed on Apr. 12, 2018.

(51) Int. Cl.
  *G01S 13/58* (2006.01)
  *G01S 13/89* (2006.01)
  *G01S 15/89* (2006.01)
  *G05D 1/00* (2024.01)

(52) U.S. Cl.
  CPC .............. *G01S 13/89* (2013.01); *G01S 15/89* (2013.01); *G05D 1/0206* (2013.01)

(56) References Cited

U.S. PATENT DOCUMENTS

| | | |
|---|---|---|
| 7,239,976 B2 | 7/2007 | Coleman et al. |
| 8,271,194 B2 | 9/2012 | Whitehead et al. |
| 9,354,303 B2 | 5/2016 | Asada et al. |
| 9,395,187 B2 | 7/2016 | Sheard et al. |
| 2021/0003693 A1 | 1/2021 | Jales et al. |

FOREIGN PATENT DOCUMENTS

| | | |
|---|---|---|
| CN | 109683185 A | 4/2019 |
| EP | 2395600 A1 | 12/2011 |
| KR | 10-1346062 B1 | 12/2013 |
| WO | WO 2019/200178 A1 | 10/2019 |

OTHER PUBLICATIONS

"Antenna Pointing & SATCOM OTM: Inertial Sensors for Antenna tracking systems and SATCOM On-The-Move (SOTM)" Nov. 29, 2022, SBG Systems, https://www.sbg-systems.com/applications/antenna-tracking-sat-otm/#product-1.

ENHANCED DOPPLER RADAR SYSTEMS AND METHODS

CROSS-REFERENCE TO RELATED APPLICATIONS

This application is a continuation of International Patent Application No. PCT/US2021/048564 filed Aug. 31, 2021 and entitled "ENHANCED DOPPLER RADAR SYSTEMS AND METHODS," which claims the benefit of and priority to U.S. Provisional Patent Application No. 63/072,915 filed Aug. 31, 2020 and entitled "ENHANCED DOPPLER RADAR SYSTEMS AND METHODS," all of which are incorporated herein by reference in their entirety.

This application is a continuation-in-part of U.S. patent application Ser. No. 17/025,864 filed Sep. 18, 2020 and entitled "ADAPTIVE DOPPLER RADAR SYSTEMS AND METHODS," which is a continuation of International Patent Application No. PCT/US2019/027101 filed Apr. 11, 2019 and entitled "ADAPTIVE DOPPLER RADAR SYSTEMS AND METHODS," which claims priority to and the benefit of U.S. Provisional Patent Application No. 62/656,874 filed Apr. 12, 2018 and entitled "ADAPTIVE DOPPLER RADAR SYSTEMS AND METHODS," all which are incorporated herein by reference in their entirety.

TECHNICAL FIELD

One or more embodiments of the invention relate generally to remote sensing systems and more particularly, for example, to systems and methods for providing Doppler radar imagery.

BACKGROUND

Remote sensing systems, such as radar, sonar, lidar, and/or other ranging sensory systems, are often used to assist in navigation by producing data and/or imagery of the environment surrounding a mobile structure, such as imagery representing above-surface and/or subsurface features critical to navigation of a watercraft over a body of water. Conventional remote sensing systems often include a display configured to provide traditionally recognizable remote sensing imagery to a user.

Remote sensing data and resulting imagery, and particularly data comprising aggregations of remote sensor returns received over time, is typically subject to a variety of measurement errors that reduce the reliability of the data. Further, motion of the remote sensing system increases the number, type, and magnitude of the measurement errors, and such errors increase the risk of misinterpreting the data and/or resulting imagery (e.g., relative ranges, depths, sizes, relative velocities, and other critical navigational cues reflected in the data). At the same time, consumer market pressures and convenience dictate easier to use systems that are inexpensive and that produce high quality and reliable data and/or that require high precision remote sensing data to provide accurate, precise, and reliable situational awareness about a vessel, including imagery derived from such remote sensing data. Thus, there is a need for an improved methodology to provide highly accurate remote sensing systems, particularly in the context of providing systems configured to produce reliable remote sensing data and/or imagery important to general operation of a mobile structure.

SUMMARY

Techniques are disclosed for systems and methods to provide remote sensing imagery (e.g., Doppler radar imagery) for mobile structures. A remote sensing imagery system may include radar assemblies, other remote sensing assemblies, and logic devices in communication with the various assemblies. Each remote sensing assembly may be adapted to be mounted to a mobile structure, and each remote sensing imagery system may include and/or be communicatively coupled to an orientation and/or position sensor (OPS). The logic devices may be configured to receive sensor data and generate imagery based on the sensor data. Subsequent user input and/or the sensor data may be used to adjust a steering actuator, a propulsion system thrust, and/or other operational systems of the mobile structure.

In various embodiments, remote sensing imagery system may include one or more orientation sensors, position sensors, gyroscopes, accelerometers, global navigation satellite system (GNSS) receivers, and/or additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include a remote sensor assembly configured to be mounted to a mobile structure and a coupled logic device. The remote sensor assembly may include an orientation and position sensor (OPS) coupled to or within the remote sensor assembly and configured to provide orientation and position data associated with the remote sensor assembly. The logic device may be configured to receive remote sensor returns corresponding to a detected target from the remote sensor assembly and orientation and/or position data corresponding to the remote sensor returns from the OPS, determine a target radial speed corresponding to the detected target, and then generate remote sensor image data based on the remote sensor returns and the target radial speed. Subsequent user input and/or the sensor data may be used to adjust a steering actuator, a propulsion system thrust, and/or other operational systems of the mobile structure In another embodiment, a method may include receiving radar returns corresponding to a detected target from a radar assembly configured to be mounted to a mobile structure; receiving orientation and/or position data corresponding to the radar returns from an orientation and position sensor (OPS) coupled to or within the radar assembly; determining a target radial speed corresponding to the detected target based, at least in part, on the radar returns and the orientation and/or position data corresponding to the radar assembly; and generating radar image data based, at least in part, on the radar returns and the target radial speed.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
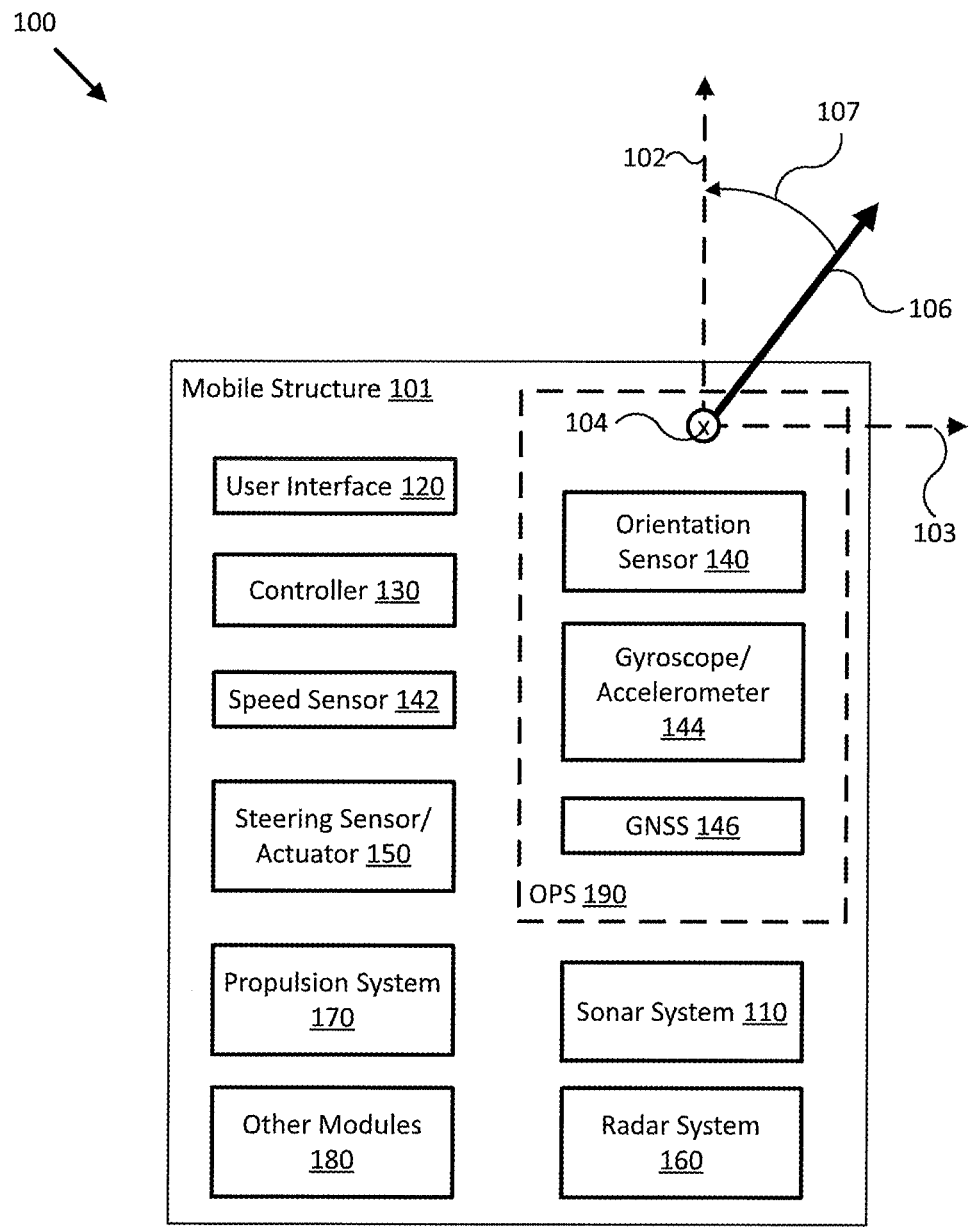
FIG. 1A illustrates a block diagram of a remote sensing imagery system in accordance with an embodiment of the disclosure.

In accordance with various embodiments of the present disclosure, remote sensing imagery may be provided by a remote sensing system (e.g., a radar and/or sonar system) including one or more remote sensing assemblies, orientation sensors, gyroscopes, accelerometers, position sensors, and/or speed sensors providing measurements of an orientation, a position, an acceleration, and/or a speed of the remote sensing assemblies and/or a coupled mobile structure. For example, the various sensors may be mounted to or within the mobile structure (e.g., a watercraft, aircraft, motor vehicle, and/or other mobile structure), or may be integrated with the remote sensing assemblies, as described herein. Embodiments of the present disclosure produce remote sensing imagery that is easily calibrated and relatively inexpensive to implement, thereby providing remote sensing imagery that is highly accurate and more accessible to consumers than conventional systems and/or methods.

Doppler radars are becoming more available due to improvements in the cost and availability of the radar technology on which they depend. A desired objective is to provide situational awareness of the bodies/sensor targets in motion about a piloted mobile structure. Mechanically scanned radar systems move the radar antenna relative to a vessel on which the radar scanner is located by mechanical means such as a motor or actuator. A radar Doppler signal may be detected as a change of phase or frequency between a transmitted signal and corresponding received reflected radar signal. Such Doppler signal is dependent on the relative motion of a radar target and the vessel on which the radar is mounted. Determining the radar target's motion relative to a fixed or moving coordinate frame, for example relative to the earth's surface (an inertial frame of reference), may involve a vector subtraction of the antenna's orientation and velocity in that same frame of reference.

Conventional systems determine a radar antenna's orientation relative to the vessel to which it is mounted, (in azimuth and/or elevation), and then to use remote (to the antenna) vessel sensors to measure the vessel's velocity and orientation relative to a selected frame of reference. Vector subtractions and additions are then used to compute a target's velocity relative to that inertial frame of reference. Errors and asynchronicity of the vessel's sensors add undesirable noise and uncertainty to the Doppler determined velocity of radar targets relative to the inertial frame. Embodiments described herein remove or at least significantly limit such errors by employing a direct measurement methodology involving mounting an inertial measurement unit (IMU) on the remote sensor antenna itself. The IMU moves with the antenna and measures the antennas orientation and velocity directly relative to the inertial frame of reference. Embodiments employ a global navigation satellite system (GNSS) compass to help reduce the cost of the IMU by periodically correcting for bias and drift common in relatively inexpensive IMUs.

As described herein, only a relative radial velocity can be measured directly using the Doppler signal. A target's tangential motion (relative to the remote sensor system) does not give rise to a Doppler signal. The tangential velocity of the target typically must be determined by other methods, such as by target tracking, where the target's relative position is measured over a time interval and the target's relative velocity, including the tangential component of that velocity, is determined based on the positions over the time interval. The advantage of using the Doppler signal, over target tracking, is that Doppler measurements provide instantaneous measurements of the relative radial component of the target's velocity, and they do so to a greater accuracy than that achievable by change of range or bearing determined by target tracking alone. The two techniques may be used together; the Doppler signal may be used to identify targets which have sufficient velocity (e.g., towards the remote sensor system) to be worth tracking. For example, targets which exceed a given radial velocity may be highlighted when displayed to a user, such as red for approaching and green for receding targets. Embodiments may remove the effect of the system's own motion and highlight only targets which are approaching or receding from the system at a given speed over ground (e.g., 3 to 5 Knots).

Embodiments of the present disclosure calculate the radial Speed Over Ground (SOG) of radar targets by measuring their Doppler velocity (e.g., the relative speed along a vector linking the system to the detected target). The radar's antenna rotates, relative to the mobile structure to which it is mounted, and at any time is pointing in a known or derivable direction relative to the mobile structure. A vector subtraction may be performed to remove the effect of the remote sensor system's motion from the target's calculated Doppler velocity, to produce the target's radial speed over ground (e.g., absolute speed measured along the vector linking the system to the detected target). By mounting the IMU on the antenna platform of the remote sensor system itself, the IMU moves with the antenna and measures the antennas orientation and velocity directly relative to the inertial frame of reference. An antenna's radial velocity relative to ground may be obtained from the Course Over Ground (COG) of the remote sensor system, the instantaneous antenna bearing, and the remote sensor system's SOG, as described herein.

The benefit of a direct measurement of the antenna's motion, rather than using a vessel's sensors and shaft encoders is that the accumulated errors due to sensor data latency and sensor accuracy can be eliminated or at least significantly reduced. Embodiments described herein use such relatively precise remote sensor data to obtain enhanced accuracy of a target's velocity or velocity spectrum (e.g., where a target has multiple separately moving portions—such as a bow turning towards the remote sensor system and a stern turning away from the remote sensor system). Such velocity spectrums or distributions are helpful for target classification and differentiation.

In various embodiments, a remote sensing imagery system according to the present disclosure may include a remote sensing system with one or more orientation and/or position sensors (OPSs) configured to provide orientation data and position data (e.g., through use of GPS, GLONASS, Galileo, COMPASS, IRNSS, and/or other global navigation satellite systems (GNSSs)). In such embodiments, the remote sensing imagery system may be configured to determine the track, course over ground (COG), and/or speed over ground (SOG) of the remote sensing system and/or the coupled mobile structure from the position data provided by the OPS. Corresponding headings (e.g., referenced to True North, for example) may be determined from the track, COG, and/or SOG, and the effects of wind and tide can be estimated and displayed or removed from the heading. Set and drift (e.g., due to tide) and leeway (e.g., due to wind) errors may be compensated for because the data provided by the OPS can be referenced to an absolute coordinate frame.

Embodiments described herein may employ a novel implementation of a GNSS+Gyro compass (orientation sensor) that uses relatively inexpensive GNSS receivers and microelectromechanical system (MEMS) gyros/accelerometers and an embedded processor to provide a relatively fast, accurate compass that does not require the use of a magnetometer or other mechanism to sense the Earth's magnetic field. For example, the orientation of a remote sensor system, a vehicle, aircraft, or vessel relative to the Earth is desirable for many applications including remote sensor imaging, ranging, and relative speed determinations.

Magnetic compasses sense the orientation of the Earth's magnetic field, and they can suffer from several known problems: variation, deviation, and alignment (lubber line alignment). In addition, a magnetic compass needs to reject the effect of the vertical component of the Earth's magnetic field (dip angle), and this is attempted by floating the compass in oil so that the compass needle is kept reasonably horizontal. However, during turns, a centripetal acceleration tilts the compass, and the vertical component is typically not completely rejected (e.g., the Northerly Turning Error (NTE)). Electronic compasses can use a similar arrangement but still suffer from NTE or use a 3D magnetometer and attempt to resolve the horizontal component of the magnetic field. However, in order to do so with precision, the local horizontal plane (relative to gravity) still needs to be determined, including during a turn. A combination of 3D gyros and 3D accelerometers may be used with a 3D magnetometer to form an Attitude and Heading Reference Sensor (AHRS), but AHRSs that use such magnetometers still suffer from Deviation, Variation and Alignment errors, as described herein.

A conventional GNSS compass may be used to reduce the influence of such errors, but in highly dynamic environments, a conventional GNSS compass's update rate (typically 10 Hz) is inadequate to keep pace with the needs of a remote sensor system, which may be performing full 360 degree sweeps about a vessel 24 or more times a minute (once every ~1-2 seconds). Embodiments described herein employ a GNSS and an IMU, where the GNSS compass is used to correct bias and gain errors (e.g., accumulation errors) typical of an inexpensive 3D IMU to provide a fast and accurate compass that does not require the use of a magnetometer or to sense the earth's magnetic field, and thereby is relatively impervious to error associated with such magnetic measurements.

On occasions the GNSS signal will be denied due to obstructions or interference. Embodiments can receive a magnetic heading from an AHRS or electronic compass mounted elsewhere on a vessel, as a fall-back, though such sensors will often be subject to reduced accuracy as discussed above. Embodiments can also receive signals from a shaft encoder or other relative angle sensor integrated with the remote sensor system that provides information on the orientation of the antenna relative to a reference direction, typically an estimate of the longitudinal axis of the vessel to which it is attached, and thus compute the vessel's heading for creation of a Head-Up radar image, for example, or for the use of other equipment on the vessel such as an autopilot. GNSS sensors on an axis of rotation for the remote sensor system can provide information on a vessel's course, should the vessel's course and heading differ for example under the influence of tide or wind. The vessel's course can be used to provide a Course-Up radar image. In the event of denial of the GNSS signal the radar image may fall-back to a Head-Up image, as described herein.

FIG. 1A illustrates a block diagram of remote sensing imagery system 100 in accordance with an embodiment of the disclosure. In various embodiments, system 100 may be adapted to measure an orientation, a position, an acceleration, and/or a speed of sonar system 110, radar system 160, user interface 120, and/or mobile structure 101 using any of the various sensors of OPS 190 and/or system 101. System 100 may then use these measurements to generate accurate image data from sonar data provided by sonar system 110 and/or radar data provided by radar system 160 according to a desired operation of system 100 and/or mobile structure 101. In some embodiments, system 100 may display resulting imagery to a user through user interface 120, and/or use the sonar data, radar data, orientation and/or sensor data, and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide radar data and/or imagery for a particular type of mobile structure 101, such as a drone, a watercraft, an aircraft, a robot, a vehicle, and/or other types of mobile structures, including any platform designed to move through or under the water, through the air, and/or on a terrestrial surface. In one embodiment, system 100 may include one or more of a sonar system 110, a radar system 160, a user interface 120, a controller 130, an OPS 190 (e.g., including an orientation sensor 140, a gyroscope/accelerometer 144, and/or a global navigation satellite system (GNSS) 146), a speed sensor 142, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, True North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, OPS 190, orientation sensor 140, and/or user interface 120, for example) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements (e.g., remote sensing system arrangements) that can be used to detect objects within a water column and/or a floor of a body of water.

More generally, sonar system 110 may be configured to emit one, multiple, or a series of acoustic beams (e.g., remote sensor beams), receive corresponding acoustic returns (e.g., remote sensor returns), and convert the acoustic returns into sonar data and/or imagery (e.g., remote sensor image data), such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide relatively accurate and/or distortion free underwater views, as described herein. Embodiments of sonar system 110 include low cost single, dual, and/or multichannel sonar systems that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with its own dedicated OPS 190, which may include various orientation and/or position sensors (e.g., similar to orientation sensor 140, gyroscope/accelerometer 144, and/or GNSS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GNSS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on a chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such embodiment, controller 130 may be configured to control the actuators associated with the transducer assembly to maintain its orientation relative to, for example, the mobile structure and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, OPS 190 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

Radar system 160 may be implemented as one or more electrically and/or mechanically coupled controllers, transmitters, receivers, transceivers, signal processing logic devices, various electrical components, antenna elements of various shapes and sizes, multichannel antennas/antenna modules, radar assemblies, assembly brackets, mast brackets, and/or various actuators adapted to adjust orientations of any of the components of radar system 160, as described herein. For example, in various embodiments, radar system 160 may be implemented according to various radar system arrangements (e.g., remote sensing system arrangements) that can be used to detect features of and objects on or above a terrestrial surface or a surface of a body of water, for instance, and/or their relative velocities (e.g., their Doppler velocities).

More generally, radar system 160 may be configured to emit one, multiple, or a series of radar beams (e.g., remote sensor beams), receive corresponding radar returns (e.g., remote sensor returns), and convert the radar returns into radar data and/or imagery (e.g., remote sensor image data), such as one or more intensity plots and/or aggregation of intensity plots indicating a relative position, orientation, and/or other characteristics of structures, weather phenomena, waves, other mobile structures, surface boundaries, and/or other objects reflecting the radar beams back at radar system 160. Radar system 160 may be configured to provide such data and/or imagery to user interface 120 for display to a user, for example, or to controller 130 for additional processing, as described herein. Moreover, such data may be used to generate one or more charts corresponding to AIS data, ARPA data, MARPA data, and or one or more other target tracking and/or identification protocols.

In some embodiments, radar system 160 may be implemented using a compact design, where multiple radar antennas, sensors, and/or associated processing devices are located within a single radar assembly housing that is configured to interface with the rest of system 100 through a single cable providing both power and communications to and from radar system 160. In some embodiments, radar system 160 may include orientation and/or position sensors (e.g., OPS 190) configured to help provide two or three dimensional waypoints, increase radar data and/or imagery quality, and/or provide highly accurate radar image data, as described herein.

For example, fisherman desire highly detailed and accurate information and/or imagery of local and remote structures, other watercraft, and other environmental or natural stationary or mobile objects, such as rock outcroppings, beaches, and birds and other natural animals. Conventional radar systems can be expensive and bulky and typically cannot be used to provide relatively accurate and/or distortion free radar image data, as described herein. Embodiments of radar system 160 include low cost single, dual, and/or multichannel (e.g., synthetic aperture) radar systems that can be configured to produce detailed two and three dimensional radar data and/or imagery. In some embodiments, radar system 160 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, radar system 160 may be implemented with its own dedicated OPS 190, which may include various orientation and/or position sensors (e.g., similar to orientation sensor 140, gyroscope/accelerometer 144, and/or GNSS 146) that may be incorporated within the radar assembly housing to provide three dimensional orientations and/or positions of the radar assembly and/or antenna(s) for use when processing or post processing radar data for display. The sensor information can be used to correct for movement of the radar assembly during and/or between beam emissions to provide improved alignment of corresponding radar returns/samples, for example, and/or to generate imagery based on the measured orientations and/or positions of the radar assembly/antenna. In other embodiments, an external orientation and/or position sensor can be used alone or in combination with an integrated sensor or sensors.

In embodiments where radar system 160 is implemented with one or more position sensors, radar system 160 may be configured to provide a variety of radar data and/or imagery enhancements. For example, radar system 160 may be configured to provide accurate positioning and/or orienting of radar data and/or user-defined waypoints remote from mobile system 101. Similarly, radar system 160 may be configured to provide accurate two and/or three dimensional aggregation and/or display of a series of radar data; without either orientation data or position data to help determine a track or heading, a radar system typically assumes a straight track, which can cause image artifacts and/or other inaccuracies in corresponding radar data and/or imagery. Additionally, when implemented with a position sensor, radar system 160 may be configured to generate accurate and detailed intensity plots of objects on a surface of a body of water without access to a magnetometer.

In embodiments where radar system 160 is implemented with an orientation and/or position sensor, radar system 160 may be configured to store such location/position information along with other sensor information (radar returns, temperature measurements, text descriptions, altitude, mobile structure speed, and/or other sensor and/or control information) available to system 100. In some embodiments, controller 130 may be configured to generate a look up table so that a user can select desired configurations of radar system 160 for a particular location or to coordinate with some other sensor information. Alternatively, an automated adjustment algorithm can be used to select optimum configurations based on the sensor information.

For example, in one embodiment, mobile structure 101 may be located in an area identified on a chart using position data, a user may have selected a user setting for a configuration of radar system 160, and controller 130 may be configured to control an actuator and/or otherwise implement the configuration for radar system 160 (e.g., to set a particular orientation or rotation rate). In still another embodiment, controller 130 may be configured to receive orientation measurements for radar system 190 and/or mobile structure 101. In such embodiment, controller 130 may be configured to control actuators associated with a radar assembly to maintain its orientation relative to, for example, the mobile structure and/or the water surface, and thus improve the displayed sonar images (e.g., by ensuring consistently oriented radar beams and/or proper registration of a series of radar returns). In various embodiments, controller 130 may be configured to control steering sensor/actuator 150 and/or propulsion system 170 to adjust a position and/or orientation of mobile structure 101 to help ensure proper registration of a series of radar returns, radar data, and/or radar imagery.

Although FIG. 1A shows various sensors and/or other components of system 100 separate from radar system 160, in other embodiments, any one or combination of sensors and components of system 100 may be integrated with a radar assembly, an actuator, a transducer module, and/or other components of radar system 160. For example, OPS 190 may be integrated with an antenna platform of sonar system 110 and be configured to provide measurements of an absolute and/or relative orientation (e.g., a roll, pitch, and/or yaw) of the antenna to controller 130 and/or user interface 120, both of which may also be integrated with radar system 160.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of sonar system 110, radar system 160, and/or mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110, or an antenna or radar assembly of radar system 160) overlaid on a geographical map, which may include one or more graphs indicating a corresponding time series of actuator control signals, sensor information, and/or other sensor and/or control signals, including sonar and/or radar image data.

In some embodiments, user interface 120 may be adapted to accept user input including a user-defined target heading, route (e.g., track for radar system 160), and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude/absolute angular frequency for an actuated device (e.g., sonar system 110, radar system 160) coupled to mobile structure 101, for example, and to generate control signals for adjusting an orientation or rotation of the actuated device according to the target attitude/angular frequency. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, radar system 160, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, radar system 160, mobile structure 101, and/or system 100.

OPS 190 may be implemented as an integrated selection of orientation and/or position sensors (e.g., orientation sensor 140, accelerometer/gyroscope 144, GNSS 146) that is configured to provide orientation and/or position data in relation to one or more elements of system 100. For example, embodiments of OPS 190 may be integrated with mobile structure 101, sonar system 110, and/or radar system 160 and be configured to provide orientation and/or position data corresponding to a center of mass of mobile structure 101, a sonar transducer of sonar system 110, and/or a radar antenna of radar system 160. Such measurements may be referenced to an absolute coordinate frame, for example, or may be referenced to a coordinate frame of OPS 190 and/or any one of the individual sensors integrated with OPS 190. More generally, OPS 190 provides a single, relatively compact integrated device that can be replicated throughout various elements of system 100, which in some embodiments may include a single/simplified interface for data and/or power. In various embodiments, the coordinate frames for one or more of the orientation and/or position sensors integrated into OPS 190 may be referenced to each other (e.g., to a single coordinate frame for OPS 190), such as at time of manufacture, to reduce or eliminate a need to determine coordinate frame transformations to combine data from multiple sensors of OPS 190 during operation of system 100.

Orientation sensor 140 may be implemented as one or more of a compass, float, accelerometer, magnetometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example. In various embodiments, orientation sensor 140 may be implemented and/or operated according to any of the systems and methods described in International Application PCT/US14/38286 filed May 15, 2014 and entitled "AUTOMATIC COMPASS CALIBRATION SYSTEMS AND METHODS", which is hereby incorporated by reference in its entirety.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, MEMS gyroscopes and/or accelerometers, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example, or some other element of system 100. In various embodiments, gyroscope/accelerometer 144 may be implemented in a common housing and/or module to ensure a common reference frame or a known transformation between reference frames.

GNSS 146 may be implemented as a global positioning satellite receiver and/or other device capable of determining absolute and/or relative position of mobile structure 101 (e.g., or an element of mobile structure 101, such as sonar system 110 radar system 160, and/or user interface 120) based on wireless signals received from space-born and/or terrestrial sources, for example, and capable of providing such measurements as sensor signals that may be communicated to various devices of system 100. More generally, GNSS 146 may be implemented to any one or combination of a number of different GNSSs. In some embodiments, GNSS 146 may be used to determine a velocity, speed, COG, SOG, track, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example.

In other embodiments, other modules 180 may include one or more actuated devices (e.g., spotlights, infrared illuminators, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130). Other modules 180 may include a sensing element angle sensor, for example, which may be physically coupled to a radar assembly housing of radar system 160 and be configured to measure an angle between an orientation of an antenna/sensing element and a longitudinal axis of the housing and/or mobile structure 101. Other modules 180 may also include a rotating antenna platform and/or corresponding platform actuator for radar system 160. In some embodiments, other modules 180 may include one or more Helmholtz coils integrated with OPS 190, for example, and be configured to selectively cancel out one or more components of the Earth's magnetic field.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein. Similarly, the same or similar components may be used to create a radar pulse (e.g., a transmission control signal and/or a digital shaping control signal), convert the radar pulse to an excitation signal (e.g., a shaped or unshaped transmission signal) and transmit it to a radar antenna to produce a radar beam, receive a radar return (e.g., an electromagnetic wave received by the radar antenna and/or corresponding electrical signals from the radar antenna), convert the radar return to radar return data, and/or store sensor information, configuration data, and/or other data corresponding to operation of a radar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110, radar system 160, and/or other sensors of system 100 to/from a coordinate frame of orientation sensor 140 and/or mobile structure 101, for example. Furthermore, such parameters may be used to determine and/or calculate one or more adjustments to an orientation of sonar system 110 and/or radar system 160 that would be necessary to physically align a coordinate frame of sonar system 110 and/or radar system 160 with a coordinate frame of orientation sensor 140 and/or mobile structure 101, for example, or an absolute coordinate frame. Adjustments determined from such parameters may be used to selectively power adjustment servos/actuators (e.g., of sonar system 110, radar system 160, and/or other sensors or elements of system 100), for example, or may be communicated to a user through user interface 120, as described herein.

Figure 1B:
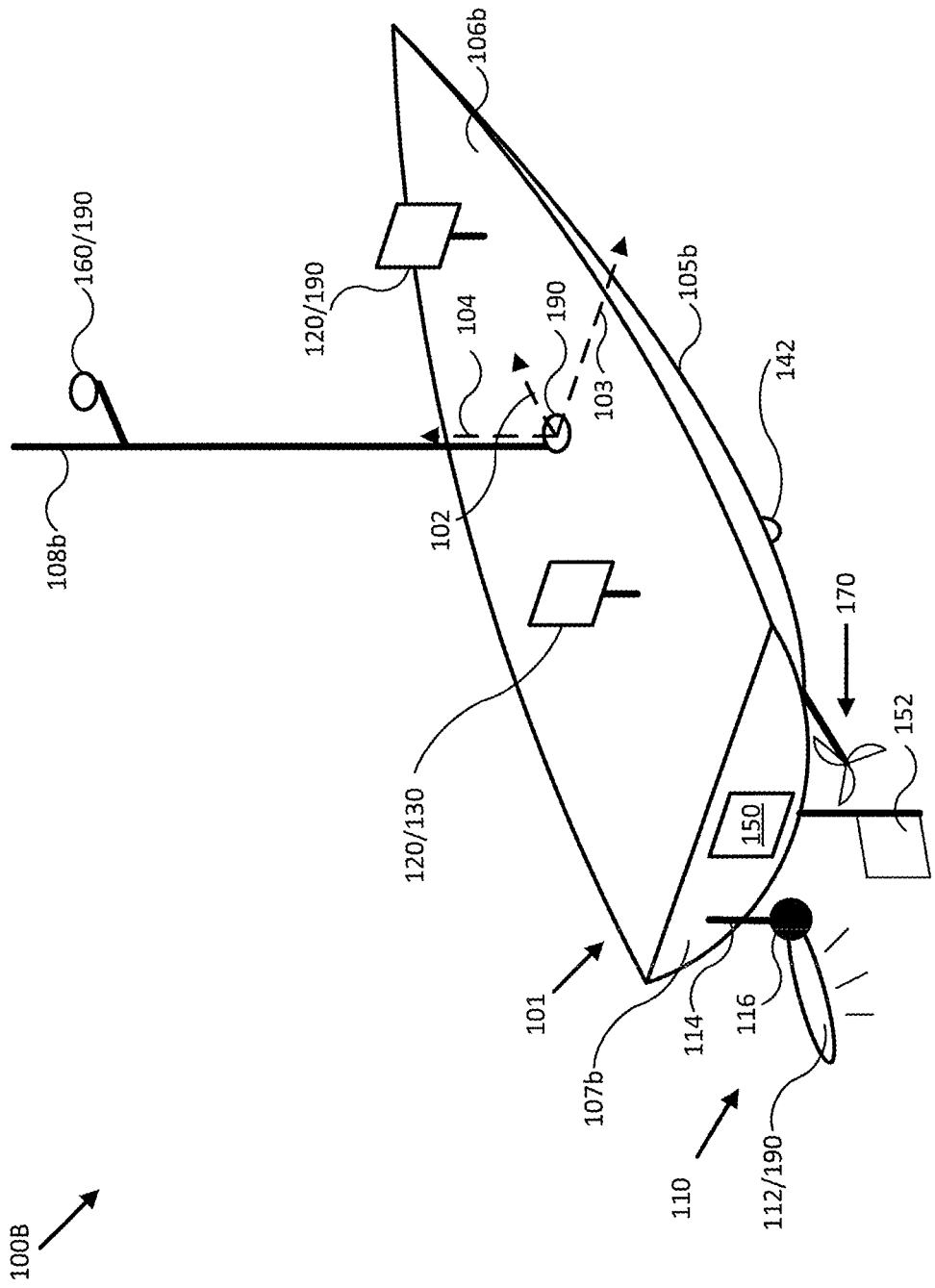
FIG. 1B illustrates a diagram of a remote sensing imagery system in accordance with an embodiment of the disclosure.

FIG. 1B illustrates a diagram of system 100B in accordance with an embodiment of the disclosure. In the embodiment shown in FIG. 1B, system 100B may be implemented to provide sonar and/or radar data and/or imagery for use with operation of mobile structure 101, similar to system 100 of FIG. 1A. For example, system 100B may include sonar system/OPS 110/190, radar system/OPS 160/190, integrated user interface/controller 120/130, secondary user interface/OPS 120/190, steering sensor/actuator 150, sensor cluster/OPS 190 (e.g., orientation sensor 140, gyroscope/accelerometer 144, and/or GNSS 146), and various other sensors and/or actuators. In the embodiment illustrated by FIG. 1B, mobile structure 101 is implemented as a motorized boat including a hull 105b, a deck 106b, a transom 107b, radar system/OPS 160/190 coupled to mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/ engine compartment, a trunk, a roof, a steering mechanism, a headlight, a radar system, and/or other portions of a vehicle.

As depicted in FIG. 1B, mobile structure 101 includes actuated sonar system 110, which in turn includes OPS 190 integrated with transducer assembly 112, which are coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar position and/or orientation sensor (SPOS), which may include one or more sensors corresponding to orientation sensor 140, gyroscope/accelerometer 144 and/or GNSS 146, for example, that is configured to provide absolute and/or relative positions and/or orientations of transducer assembly 112 to facilitate actuated orientation of transducer assembly 112.

Also shown in FIG. 1B is radar system 160, which may include integrated OPS 190 and a radar antenna platform and actuator configured to rotate the radar antenna about a vertical axis substantially aligned with vertical axis 104 of mobile structure 101. In some embodiments, user interface/controller 120/130 may be configured to receive radar returns from a radar assembly of radar system/OPS 160/190, and corresponding orientation and/or position data from radar system/OPS 160/190 (e.g., corresponding to an orientation and/or position of an antenna of radar system 160 when the radar returns are received), and then generate radar image data based, at least in part, on the radar returns and the corresponding orientation and/or position data.

More generally, both sonar system 110 and radar system 160 are types of remote sensing systems, each with remote sensing assemblies (e.g., sonar assemblies, radar assemblies) including housings adapted to be mounted to mobile structure 101, each with OPS disposed within their respective housings and adapted to measure an orientation and/or position of an associated sensing element (e.g., sonar transducer, radar antenna), and each having access to or integrated with a logic device (e.g., controller 130) configured to receive remote sensor returns from the corresponding remote sensing assembly and sensor return orientation and/or position data from the corresponding OPS and generate remote sensor image data based, at least in part, on the remote sensor returns and the sensor return orientation and/or position data. Once the remote sensor image data is received, user interface/controller 120/130 may be configured to render the remote sensor image data on a display of any one of user interface 120, for example. In some embodiments, multiple sets of remote sensor image data may be displayed on the same user interface using one or more geo-referenced, target references, and/or source references overlays.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
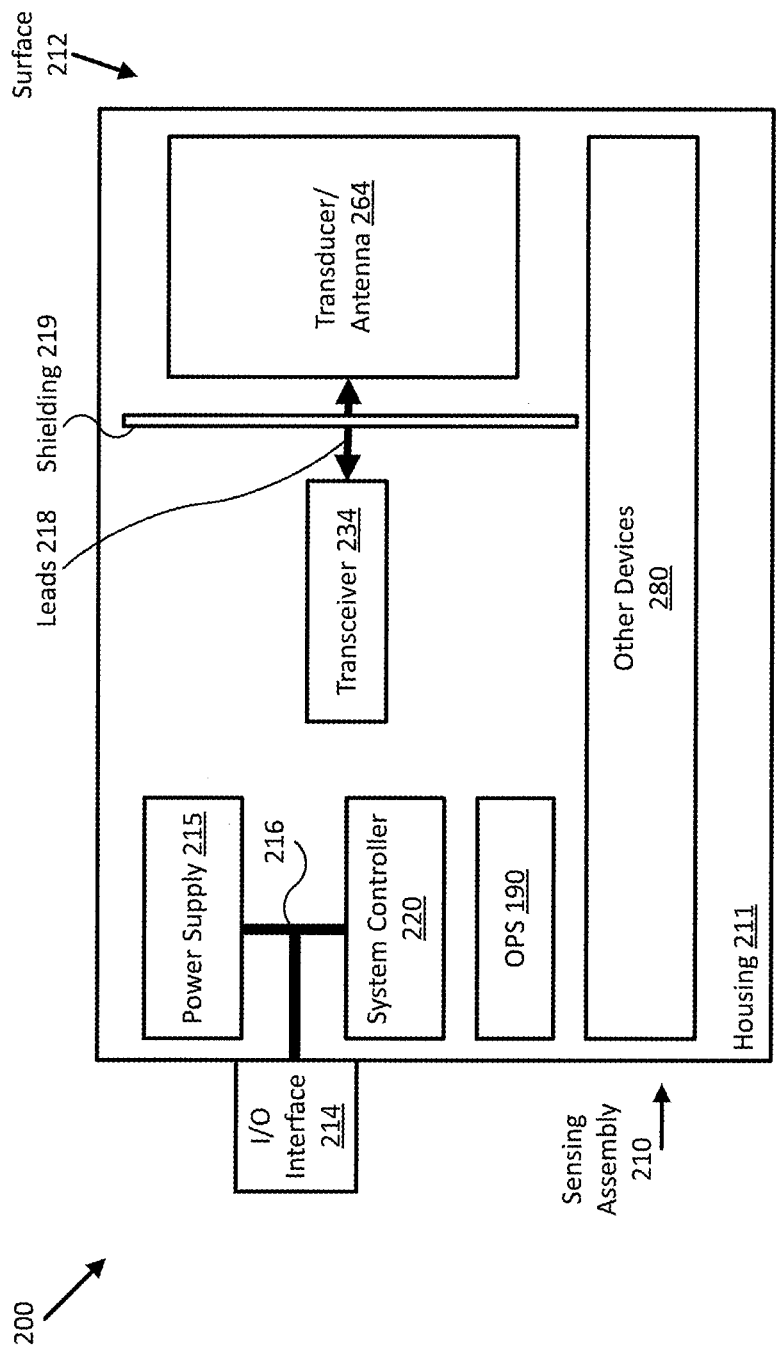
FIG. 2 illustrates a diagram of a remote sensing imagery system in accordance with an embodiment of the disclosure.

FIG. 2 illustrates a diagram of a remote sensing imagery system 200 in accordance with an embodiment of the disclosure. In the embodiment shown in FIG. 2, system 200 includes a remote sensing assembly 210 (e.g., a radar or sonar assembly) that can be coupled to a user interface (e.g., user interface 120 of FIG. 1A) and/or a power source through a single I/O cable 214. As shown, remote sensing assembly 210 may include one or more system controllers 220, sensing elements (e.g., transducer/antenna 264), OPS 190, and/or other devices facilitating operation of system 200 all disposed within a common housing 211. In other embodiments, one or more of the devices shown in FIG. 2 may be integrated with a remote user interface and communicate with remaining devices within remote sensing assembly 210 through one or more data and/or power cables similar to I/O cable 214.

Controller 220 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of remote sensing assembly 210 and/or system 200, for example, similar to controller 130. In typical embodiments, controller 220 may be tasked with overseeing general operation of remote sensing assembly 210, generating remote sensor image data from remote sensor returns and sensor return orientation and/or position data, correlating sensor data with remote sensor data/imagery, communicating operational parameters and/or sensor information with other devices through I/O cable 214, and/or other operations of system 200. Controller 220 may in some embodiments be implemented with relatively high resolution timing circuitry capable of generating digital transmission and/or sampling control signals for operating transmitters, receivers, transceivers, signal conditioners, and/or other devices of remote sensing assembly 210, for example, and other time critical operations of system 200, such as per-sample digital beamforming and/or interferometry operations applied to remote sensor returns from sensing element 264, as described herein.

In some embodiments, controller 220 may be implemented in a distributed manner across a number of individual controllers. In a particular embodiment, controller 220 may be implemented as a dual-core processor with one core dedicated to receiving a processing sensor data provided by OPS 190, for example, and the other core dedicated to all remaining operations of remote sensor system 200 (e.g., receiving and processing remote sensor data, external interfacing with other elements of system 100, system control, and system health monitoring).

Transceiver 234 may be implemented with one or more digital to analog converters (DACs), signal shaping circuits, filters, phase adjusters, signal conditioning elements, amplifiers, timing circuitry, logic devices, and/or other digital and/or analog electronics configured to accept digital control signals from controller 220 and to generate transmission signals to excite a transmission channel/element of remote sensing assembly 210 (e.g., sensing element 264, which in some embodiments can be used to transmit remote sensor beams and receive sensor returns) to produce one or more remote sensor beams. In some embodiments, various transmission operations of transceiver 234 (e.g., amplification, frequency dependent filtering, transmit signal frequency, duration, shape, and/or timing/triggering, and/or other signal attributes), may be controlled (e.g., through use of various control signals) by controller 220, as described herein.

Transceiver 243 may also be implemented with one or more analog to digital converters (ADCs), filters, phase adjusters, signal conditioning elements, amplifiers, timing circuitry, logic devices, and/or other digital and/or analog electronics configured to accept analog remote sensor returns from a corresponding receive channel/sensing element of remote sensing assembly 210 (e.g., sensing element 264), convert the analog remote sensor returns into digital remote sensor returns, and provide the digital sensor returns to controller 220. In some embodiments, various receive operations of transceiver 234 (e.g., amplification, frequency dependent filtering, basebanding, sample resolution, duration, and/or timing/triggering, and/or other ADC/signal attributes) may be controlled by controller 220.

For example, controller 220 may be configured to use transceiver 234 to convert a remote sensor return into a digital remote sensor return comprising one or more digital baseband transmissions that are then provided to controller 220. In some embodiments, transceiver 234 may be configured to low-pass or otherwise filter, amplify, decimate, and/or otherwise process the analog and/or digital remote sensor returns (e.g., using analog and/or digital signal processing) prior to providing the digital remote sensor returns to controller 220. In other embodiments, transceiver 234 may be configured to provide substantially unprocessed (e.g., raw) analog and/or digital remote sensor returns to controller 220 for further signal processing, as described herein. In further embodiments, transceiver 234 may be implemented as one or more separate transmitters and receivers.

In the embodiment shown in FIG. 2, sensing element 264 is implemented as a single transmission/receive channel that may be configured to transmit remote sensor beams and receive remote sensor returns through emission surface 212 of housing 211. In some embodiments, remote sending assembly 210 may be implemented with multiple transmission and/or receive channels (e.g., a multichannel sonar transducer, or a multichannel/synthetic aperture radar antenna). In general, remote sending assembly 210 may be implemented with one, two, or many separate elements configured to produce one or more remote sensor beams, and one, two, or many separate sensing elements configured to receive remote sensor returns. The effective volumetric shapes of the remote sensor beams and remote sensor returns may be determined by the shapes and arrangements of their corresponding transducer elements. In multichannel embodiments, the various channels may be arranged to facilitate multichannel processing, such as beamforming, interferometry, inter-beam interpolation, and/or other types of multichannel processing used to produce remote sensor data and/or imagery.

In FIG. 2, sensing element 264 is coupled to its electronics over leads 218 and through shielding 219. In various embodiments, leads 218 and/or shielding 219 may be implemented as one or more shielded transmission lines configured to convey analog and/or digital signals between the various elements while shielding transceiver 234 and sensing element 264 from electromagnetic interference from each other, other elements of remote sensing assembly 210 (e.g., OPS 190), and/or external sources. In some embodiments, leads 218 and shielding 219 may be integrated together to form a transmission system. For example, shielding 219 may be configured to provide a ground plane/return for signals conveyed by leads 218.

As shown, remote sensing assembly 210 is implemented with OPS 190, which may be configured to measure a relative and/or absolute orientation and/or position of remote sensing assembly 210 and/or sensing element 264 and provide such measurements to controller 220. In some embodiments, controller 220 may be configured to combine remote sensor data and/or imagery according to such measurements and/or measurements of an orientation and/or position of a coupled mobile structure to produce combined remote sensor data and/or imagery, such as multiple co-registered remote sensor images, for example, and/or three dimensional remote sensor imagery. In other embodiments, controller 220 may be configured to use orientation and/or position measurements of remote sensing assembly 210 and/or a coupled mobile structure to control one or more actuators (e.g., other devices 280) to adjust a position and/or orientation of remote sensing assembly 210 and/or sensing element 264 and emit remote sensor beams towards a particular position and/or orientation, for example, or otherwise control motion of remote sensing assembly 210 and/or sensing element 264.

Other devices 280 may include other and/or additional sensors, sensor arrays, actuators, logic devices, communications modules/nodes, power distribution components, and/or user interface devices used to provide additional environmental information and/or configuration parameters, for example, and/or to adjust a position and/or orientation of remote sensing assembly 210 and/or sensing element 264. In some embodiments, other devices 280 may include a visible spectrum camera, an infrared camera, and/or other environmental sensors providing measurements and/or other sensor signals that can be displayed to a user and/or used by other devices of remote sensing assembly 210 (e.g., controller 220) to provide operational control of remote sensing assembly 210. In some embodiments, other devices 280 may include one or more actuators adapted to adjust an orientation (e.g., roll, pitch, and/or yaw) and/or a position (longitudinal, lateral, and/or vertical) of remote sensing assembly 210 and/or sensing element 264 relative to a coupled mobile structure, in response to one or more control signals (e.g., provided by controller 220). In other embodiments, other devices 280 may include one or more brackets, such as a transom bracket or a mast bracket, adapted to couple housing 211 to a mobile structure.

Other devices 280 may also include a sensing element angle sensor, for example, which may be physically coupled to housing 211 of remote sensing assembly 210 and be configured to measure an angle between an orientation of sensing element 264 and a longitudinal axis of housing 211 and/or mobile structure 101, and provide such angle (e.g., as orientation and/or position data) to controller 220 and/or 130. Such sensing element angle sensor may also be implemented as an OPS, similar to OPS 190, for example, or an optical sensor, as described herein. Other devices 280 may also include a rotating platform and/or corresponding platform actuator for sensing element 264 and/or remote sensing assembly 210. In some embodiments, other devices 280 may include one or more Helmholtz coils integrated with OPS 190, for example, and be configured to selectively cancel out one or more components of the Earth's magnetic field, as described herein.

In various embodiments, remote sensing assembly 210 may be implemented in a single housing 211 with a single interface (e.g., I/O cable 214) to simplify installation and use. For example, I/O cable 214 may be implemented as a power-over-Ethernet (POE) cable supporting transmission of both communications and power between remote sensing assembly 210 and elements of a coupled mobile structure. Such communications and/or power may be delivered over leads 216 to power supply 215 and/or controller 220. Power supply 215 may be implemented as one or more power conditioners, line filters, switching power supplies, DC to DC converters, voltage regulators, power storage devices (e.g., batteries), and/or other power supply devices configured to receive power over leads 216 and/or distribute power to the various other elements of remote sensing assembly 210.

Figure 3A:
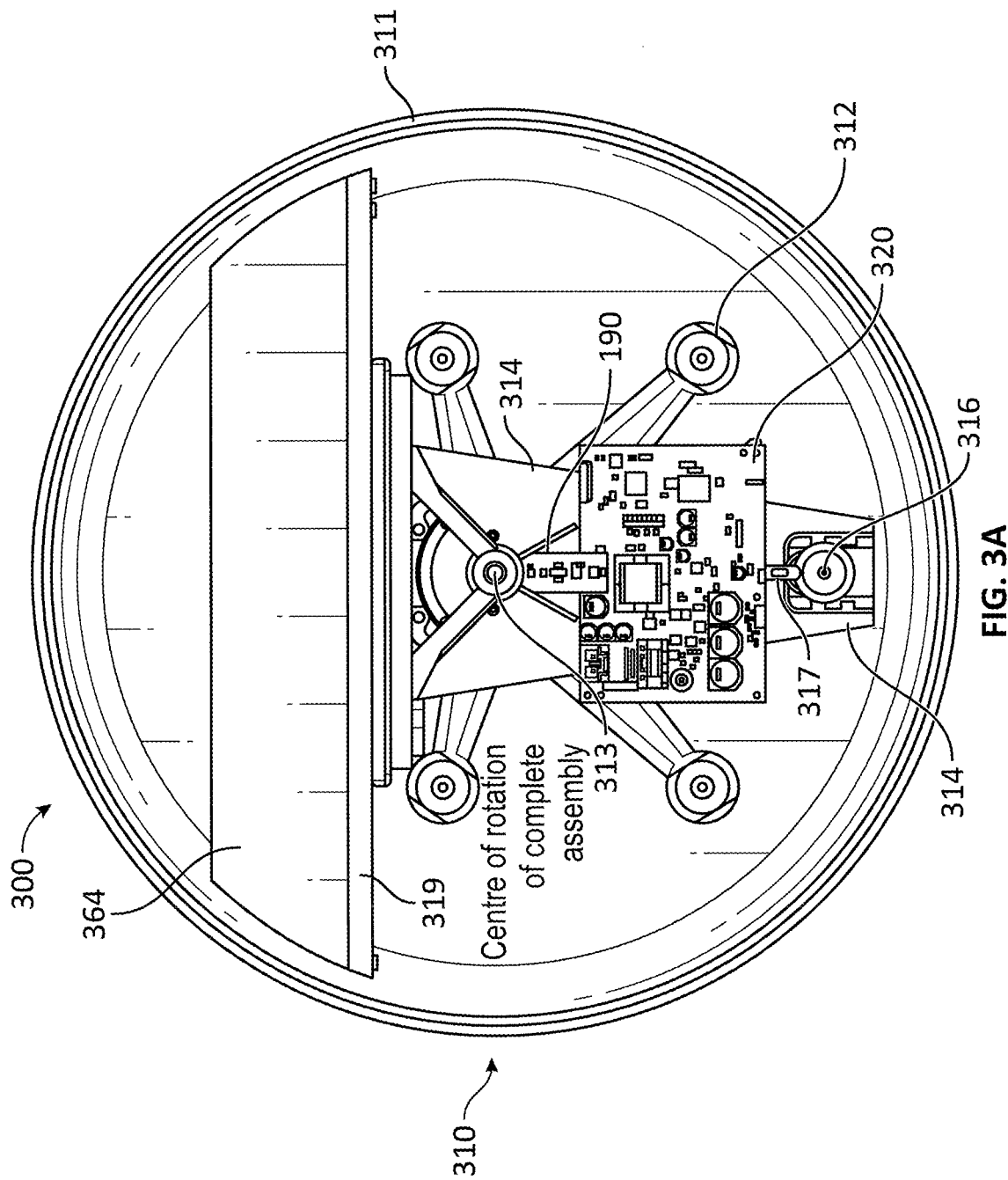
FIG. 3A illustrates a diagram of a remote sensing imagery system in accordance with an embodiment of the disclosure.

FIG. 3A illustrates a diagram of a remote sensing imagery system 300 in accordance with an embodiment of the disclosure. In the embodiment shown in FIG. 3A, remote sensing imagery system 300 is implemented as a dome radar system including a dome radar assembly 310, housing 311, and radar antenna 364 shielded from system controller 320 and OPS 190 by shielding 319, which correspond to and/or may be implemented similarly to remote sensing assembly 210, housing 211, sensing element 264, controller 220, OPS 190, and shielding 219 of FIG. 2, respectively. Also shown are antenna platform 314 and platform actuator 316 configured to rotate antenna 364, shielding 319, controller 320, and OPS 190 about axis 313, and sensing element (e.g., radar antenna) angle sensor 317 configured to measure an angle between an orientation of antenna 364 and a longitudinal axis of housing 311 (e.g., a vertical line passing perpendicularly through the antenna surface in the orientation shown in FIG. 3A).

In some embodiments, radar antenna angle sensor 317 may be implemented as an optical sensor configured to monitor a position of platform actuator 316 and/or optically visible marks on platform actuator 316, for example, and derive the measured angle from the monitored position. In other embodiments, radar antenna angle sensor 317 may be configured to detect passage over one or more indexed posts 312 corresponding to a known orientation of antenna 364 relative to a longitudinal axis of housing 311. Controller 320 may be configured to receive a measured angle corresponding to a particular known relative orientation when radar antenna angle sensor 317 passes over the appropriate indexed post 312.

In some embodiments, OPS 190 may include an embodiment of gyroscope/accelerometer 144 and one or more embodiments of GNSS 146 that can be configured to determine an absolute orientation and/or position of mobile structure 101.

For example, at a relatively low time resolution or update rate (e.g., 20 Hz or less), OPS 190 and/or controller 220 may be configured to measure a phase modulation of a GNSS carrier signal caused by offset rotation about an axis, such as offset rotation of a GNSS receiver of OPS 190 about axis 313, which can change the distance of OPS 190 relative to a GNSS transmitter/satellite substantially enough to measurably modulate the phase of the corresponding GNSS carrier signal. Based on one or more of the diameter of the offset rotation, the rotational frequency of the rotation, and the angle of the offset rotation relative to housing 311, coupled with the phase modulation and the known absolute position of the satellite (e.g., provided by the GNSS signal), remote sensing imagery system 300 may be configured to determine an absolute orientation and/or position of antenna 364, for example, at the relatively low time resolution. In addition, rotating OPS 190 through at least 180 degrees can help reduce multipath effects (e.g., GNSS signal degradation), provided the period of rotation is fast relative to the rotation of the vessel about its yaw axis (e.g., at least 5 or 10 times as fast), and provided that the multipath effects are relatively constant over the rotational period of the antenna.

At the same time, and at a relatively high time resolution or update rate (e.g., greater than 30 Hz), gyroscope/accelerometer 144 of OPS 190 may be configured to provide measurements of angular and/or linear relative accelerations of OPS 190 (e.g., relative to a coordinate frame of OPS 190 and/or remote sensor system 300), which may be integrated to provide relative velocities of OPS 190, which may in turn be combined with absolute position and/or orientation measurements derived from sensor data provided by one or more GNSSs of OPS 190 to provide absolute positions and/or orientations of antenna 364 at the relatively high time resolution. In particular, the sensor data provided by the one or more GNSSs of OPS 190 may be used to reduce and/or eliminate bias and/or gain errors (accumulation drift) in the sensor data provided by gyroscope/accelerometer 144 of OPS 190, periodically at the relatively low time resolutions (e.g., typically 10-20 Hz).

In various embodiments, gyroscope/accelerometer 144 of OPS 190 is disposed at or adjacent to rotational axis 313, and a single GNSS 146 of OPS 190 is disposed spaced apart from rotational axis 313 (e.g., at an opposing end of OPS 190) so as to generate a measurable phase modulation, as described herein. In some embodiments, OPS 190 may include an additional GNSS 146 one disposed at or adjacent to rotational axis 313, so as to provide a more precise instantaneous measurement of the position of antenna 364 and/or to increase the rate of the measurement of maximum phase modulation by a factor of 2 (e.g., where the two GNSSs swap relative orientation on a baseline—the line segment separating the two GNSSs).

Figure 3B:
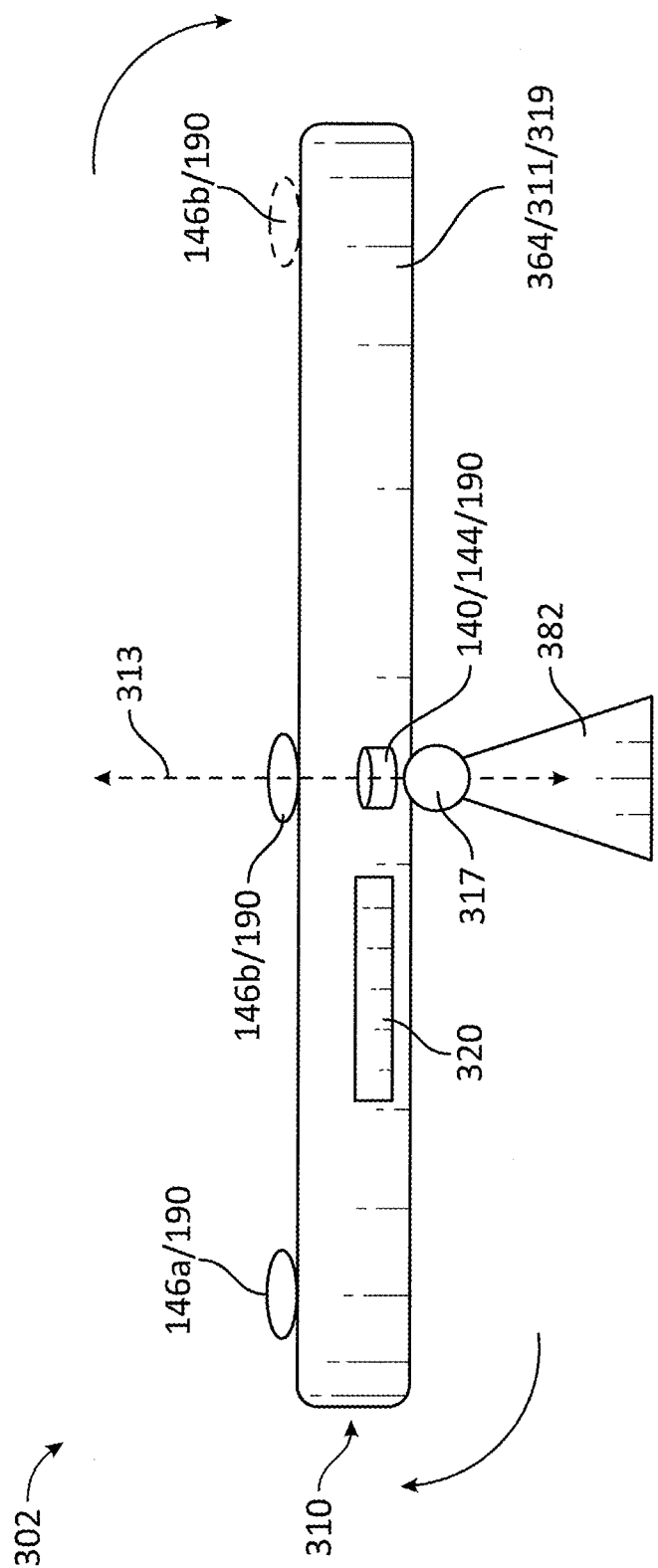
FIG. 3B illustrates a diagram of a remote sensing imagery system in accordance with an embodiment of the disclosure.

FIG. 3B illustrates a diagram of a remote sensing imagery system 302 in accordance with an embodiment of the disclosure. In the embodiment shown in FIG. 3B, remote sensing imagery system 302 is implemented as a boom radar system including a boom radar assembly 310, housing 311, and radar antenna 364 shielded from system controller 320 and OPS 190 (e.g., GNSSs 146a-c, orientation sensor 140, and gyroscope/accelerometer 144) by shielding 319, which correspond to and/or may be implemented similarly to remote sensing assembly 210, housing 211, sensing element 264, controller 220, OPS 190, and shielding 219 of FIG. 2, respectively. Also shown is radar pedestal/mast bracket 382 (e.g., encompassing antenna platform 314 and platform actuator 316) configured to support and rotate antenna 364, shielding 319, controller 320, and OPS 190 about axis 313, and sensing element (e.g., radar antenna) angle sensor 317 configured to measure an angle between an orientation of antenna 364 and a longitudinal axis of housing 311 (e.g., a vertical line passing perpendicularly through the antenna surface—away from the face of the page—in the orientation shown in FIG. 3B). In various embodiments, radar antenna angle sensor 317 may be configured to monitor a position of platform actuator 316 and/or antenna platform 314, for example, and derive the measured angle from the monitored position.

Figure 3C:
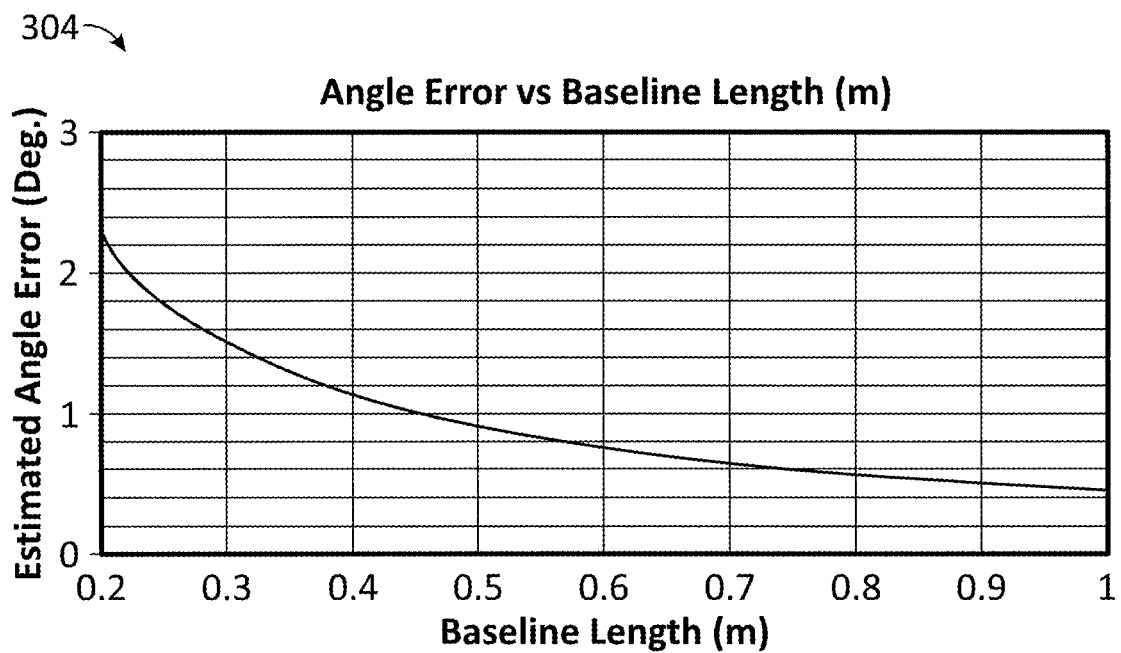
FIG. 3C illustrates a graph of estimated intrinsic orientation error of a global navigation satellite system (GNSS) compass for a remote sensing imagery system in accordance with an embodiment of the disclosure.

As shown in FIG. 3B, OPS 190 may include one, two, or three GNSSs 146a-c, so as to select a particular baseline length between the GNSSs so as to reduce intrinsic absolute orientation errors, as described herein. For example, FIG. 3C illustrates a graph 304 of estimated intrinsic absolute orientation error of a global navigation satellite system (GNSS) compass (e.g., implemented by GNSSs 146a-c) for remote sensing imagery system 302 in accordance with an embodiment of the disclosure. As can be seen from graph 304, a half meter or greater baseline length (e.g., distance between GNSSs rotating about axis 313) results in an intrinsic absolute orientation error less than 1 degree for each orientation measurement. In some embodiments, OPS 190 of system 302 may be implemented with 2 GNSSs an opposing ends of antenna 364, for example, so as to minimize the intrinsic absolute orientation error. In other embodiments, a minimum baseline length (e.g., 0.5 m) may be used for multiple different embodiments of boom radar assembly 310 (e.g., with different antenna boom widths) so as to standardize the error and/or calculation of absolute orientations across a range of boom radar assemblies 310 with varying antenna boom widths. In a particular embodiment, OPS 190 may include a first GNSS 146b disposed at or adjacent rotation axis 313 of boom radar assembly 310 and a second GNSS (e.g., GNSS 146a or 146c) disposed a preselected baseline distance away from GNSS 146b towards one end of boom radar assembly 310 (e.g., to standardize the intrinsic absolute orientation error), for example, or disposed at one end of boom radar assembly 310 (e.g., to minimize the intrinsic absolute orientation error).

Figure 4A:
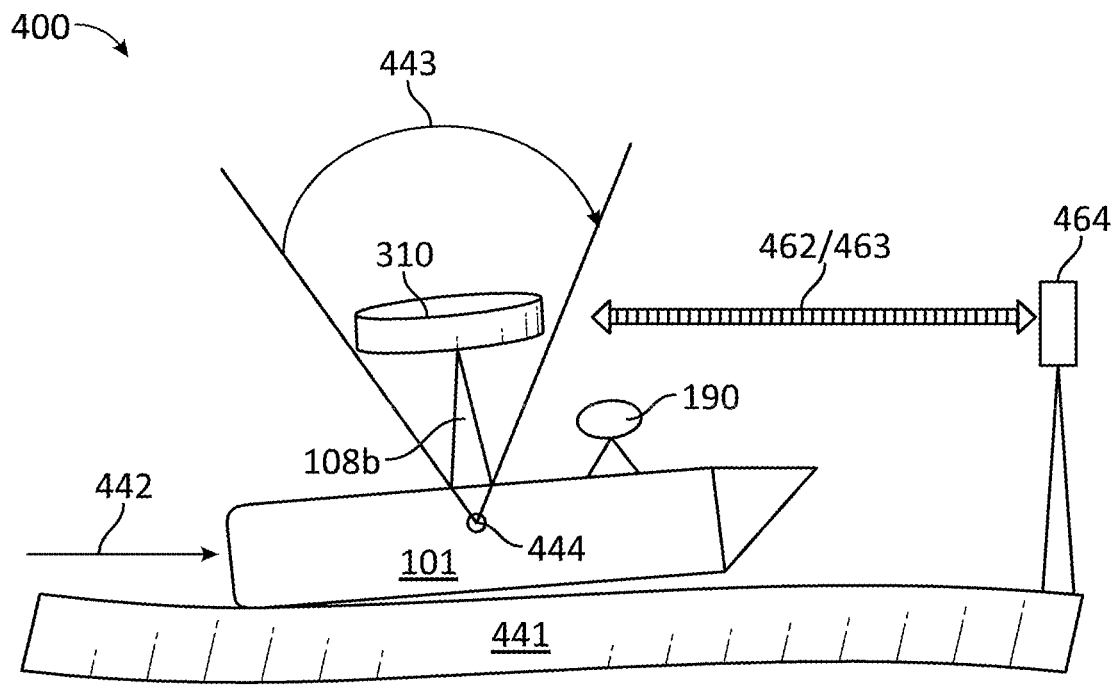
FIG. 4A illustrates a diagram of a remote sensing imagery system in accordance with an embodiment of the disclosure.

FIG. 4A illustrates a diagram of a remote sensing imagery system 400 in accordance with an embodiment of the disclosure. As shown in FIG. 4A, system 400 includes mobile structure 101 with radar assembly 310 and OPS 190 being disturbed by water 441 as it travels with a certain speed through water 442 over water 441 and emits radar beams 462 towards, and receives radar returns 463 from, target 464. Errors in the calculation of a radial speed are intrinsic in the dynamics and geometry of system 100 due to roll, pitch and yaw of mobile structure 101. For example, the pitch angle 443 of mobile structure 101 varies as mobile structure 101 hits a wave, and radar assembly 310 and OPS 190 accelerate as they pitch about center of mass 444 of mobile structure 101. The various velocities (e.g., Doppler velocity, velocity of mobile structure 101, in terms of COG and SOG) measured by radar assembly 310 and OPS 190 are generally not the same unless they are co-sited and synchronized.

Figure 4B:
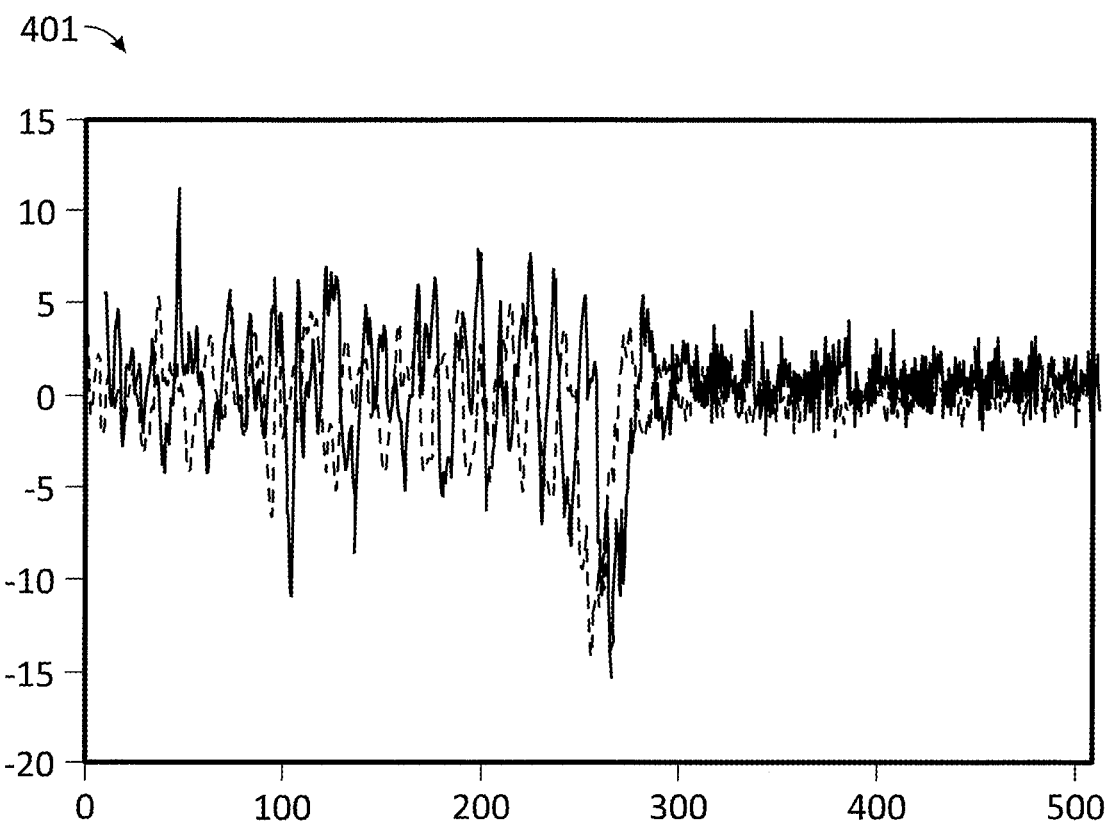
FIG. 4B illustrates a graph of typical yaw rates experienced by a remote sensing imagery system in accordance with an embodiment of the disclosure.

A GNSS compass is a special case of a moving baseline where the linear separation of the two receivers (or one receiver at 180 degree rotational displacements) is fixed but their relative orientation varies cyclically at a substantially known rate of for example 24 RPM or 48 RPM. The GNSS update rate (e.g., ~10 Hz-18 or 20 HZ) is inadequate to cater for the more extreme changes observed in mobile trials. For example, FIG. 4B illustrates a graph 401 of typical yaw rates experienced by remote sensing imagery system 400 in accordance with an embodiment of the disclosure. In graph 401, the unintentional yaw rate due to wave motion was measured as follows: the horizontal axis is seconds and the vertical axis is degrees per second. As can be seen in FIG. 4B, the yaw motion up to 250 seconds was unintentional and peaked at +/−10 degrees/second, with very fast rise and fall times. Sampling this at 10 Hz with a potential 0.1 second latency is likely to miss or misplace the peaks. An update rate for gyroscope/accelerometer 144 of OPS 190 can be much higher, easily a factor of 10 higher, but is subject to accumulation error in the form of bias and gain drift across an integration period. A GNSS compass may be used to correct the bias and drift periodically and often enough so that the accumulation error stays well below the typical errors caused by system latency and asynchronous measurements by sensors not mounted directly to radar assembly 310. For example, a common specification for an inexpensive gyroscope/accelerometer 144 may be +/−15 degrees/second when set for 500 deg/sec full scale. The bias can be corrected at 10 Hz using the GNSS compass, reducing the error to the rate of change of the bias.

Figure 4C:
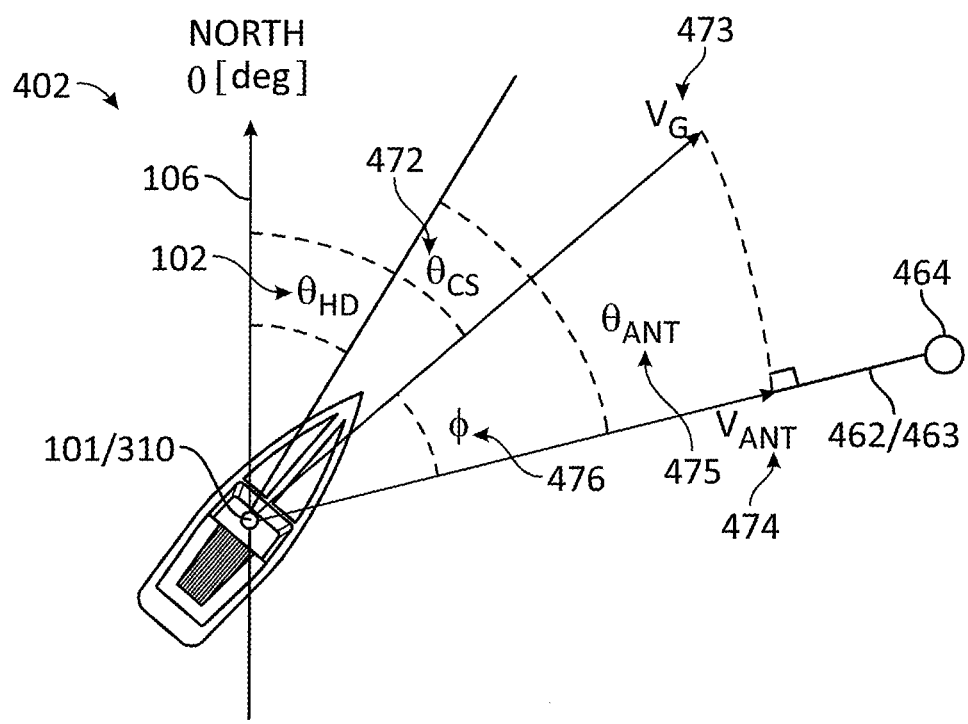
FIG. 4C illustrates a diagram showing a technique to determine a radial velocity for a remote sensing imagery system in accordance with an embodiment of the disclosure.

FIG. 4C illustrates a diagram 402 showing a technique to determine a radial velocity for remote sensing imagery system 100 in accordance with an embodiment of the disclosure. In particular, diagram 4C shows reference direction/True North 106, heading 102 (thetaHD) for mobile structure 101/radar assembly 310 relative to reference direction 106, and radar beams 462 and radar returns 463 transmitted/reflected between radar assembly 310 and target 464 along the direction of absolute radial velocity 474 of radar assembly 310 (Vant)—the absolute orientation of radar antenna 364 at the time depicted in FIG. 4C. Also shown in diagram 402 are radar assembly absolute velocity 473 (Vg) (e.g., the SOG for rotation axis 313 of radar assembly 310 along traveling azimuth 472 [thetaCS] in polar coordinates—often the same for mobile structure 101 when pitch and roll are ignored), antenna relative orientation 475 (e.g., thetaANT, relative to a heading of mobile structure 101), and angle 476 (phi) between mobile structure absolute velocity 473 and absolute antenna radial velocity 474. In various embodiments, mobile structure absolute velocity 473 may not be aligned with heading 102 due to a course disturbance (e.g., caused by tidal set and drift and/or crosswind effects), and so traveling azimuth 472 is not always the same as heading 102. In some embodiments, the numerical difference heading 102−traveling azimuth 472 may be referred to as a heading correction.

Conventionally, various relative measures of bearings, velocities, and antenna angles and needed to determine Vant, each of which contribute error to the determination. For example, in some embodiments, the antenna radial velocity may be computed from:

$$Vant=|Vg|*\cos(thetaANT+(thetaHD-thetaCS));$$

Where thetaHD−thetaCS is the heading correction, thetaANT is the azimuth of a radar antenna of radar assembly 310 (e.g., a relative orientation of the radar antenna relative to longitudinal axis/heading 102 of mobile structure 101, provided by radar antenna angle sensor 317), SOG is the SOG of mobile structure 101 and/or radar assembly 310, and Vant is the radial velocity of radar assembly 310 and/or a radar antenna of radar assembly 310 (e.g., the absolute speed/SOG of radar assembly 310 in the direction towards target 464, or the component of the SOG of mobile structure 101/radar assembly 310 in the direction towards target 464). In practice, determining the heading correction (e.g., thetaHD−thetaCS) may require detecting if they lie on either side of North (e.g., zero degrees) and correcting the result as follows (pseudocode):

If(thetaHD−thetaCS)←180 then(thetaHD−thetaCS)= (thetaHD−thetaCS)+360; else

If(thetaHD−thetaCS)>180 then(thetaHD−thetaCS)= (thetaHD−thetaCS)−360; end;

Where thetaHD and thetaCS 0 to 360 are in degrees relative to North.

As described herein, radar antenna angle sensor 317 is internal to radar assembly 310 and has a zero error of typically +/−1 degree as it is performed as a user calibration from observing the radar return from a known target. This is necessary as the radar apparatus can be fitted rotated at an arbitrary angle relative to the fore-aft line of mobile structure 101. In addition, a non-linearity of +/−1 degree would be typical due to errors in low-cost sensors. The resolution is typically much higher, and latency is low as it is internal to the radar, so the sensor data is not delayed. Other sensors that are external to radar assembly 310 have relatively large static and dynamic errors as discussed herein. For example, when disposed external to radar assembly 310, the expected latency can be at or above 100 ms, and the thetaHD measurement errors may be expected to exceed +/−5 degrees, on top of the latency errors and +/−7.5 degrees of error attributable to yaw rate. Even for small heading corrections, the error can propagate to 10% or more of the SOG of mobile structure 101, which renders the radar sensor data too imprecise to generate reliable target radial speeds and/or velocity spectrums/distributions, which forecloses types of target identification and classification techniques, particularly natural environment target identification and classification, as described herein.

Embodiments avoid all such errors by integrating OPS 190 including both embodiments of gyroscope/accelerometer 144 and embodiments of GNSS 146 and using them to measure the orientation and position of radar assembly directly, in a manner that takes advantage of the relatively high update rates and short term precision achievable by inexpensive embodiments of gyroscope/accelerometer 144 and the relatively slow update rate but long term reliable absolute orientation and position measurements achievable by inexpensive embodiments of GNSS 146. In various embodiments, a Doppler velocity of target 464 may be determined based, at least in part, on the pulse transmission wavelength and pulse transmission interval (PRI) of transmitted radar beams and the characteristics of radar returns reflected from target 464, where the pulse characteristics are used to determine wavelength and phase shifts in the radar returns that indicate the Doppler velocity of target 464 and/or the Doppler velocity spectrum of different portions of target 464.

In various embodiments, OPS 190 may include a 3 axis embodiment of gyroscope/accelerometer 144 and a 3 axis magnetometer (e.g., orientation sensor 140). Such magnetometer suffers from the intrinsic errors noted herein, and so embodiments employ a rotating GNSS compass to provide VG and VANT directly, as discussed herein. The update rate of the GNSS compass is typically 10 Hz and is inadequate as theta (the absolute version of thetaANT) changes too quickly. A 3-axis gyroscope/accelerometer 144 may be used to provide the instantaneous value of theta about the axis of rotation 313 of radar assembly 310, which is positioned to be approximately parallel with one of the three axes. The drift and bias of gyroscope/accelerometer 144 may be compensated for by the average rate of rotation of the antenna (e.g. 24 RPM) and the GNSS/GNSS compass measurements.

In various embodiments, radar antenna angle sensor 317 is not required for the calculation of VANT. In practice it is useful to use ThetaANT and VG to determine thetaHD, which can be passed to other equipment on the vessel that might want to use it for example for display or to provide a Head-Up radar picture, where the vessels fore-aft line is drawn on the y axis of the display with the bow towards the top of the screen. ThetaANT can be used alone to produce a Head-Up radar picture (PPI) in the event of failure of any of the other sensors or areas in denial of the GNSS signal. In some embodiments, the Head-Up PPI can be rotated to produce a North-Up PPI, using a thetaHD sensor and a sensor for thetaANT (typically a rotary shaft encoder). Embodiments described herein may produce a North-Up PPI that can be rotated to produce a Head-Up PPI without need of additional sensors.

Passing data from OPS 190 to controller 320 can be achieved in several ways. For example, by using sliprings or wireless transmission. The latency needs to be kept low so that the signals received during one PRI can be phase corrected before the next pulse. One approach is to integrate controller 320 with radar assembly 310, as described herein. The latency of the data after phase correction (e.g., Doppler velocity determination and/or absolute radial target velocity determination) can be much greater, if the corrected data is buffered in controller 320, for example a quarter of a revolution or 0.625 seconds if the antenna rotates at 24 RPM. The transmission can then be made using higher latency methods such as Ethernet or Wi-Fi.

Figure 4D:
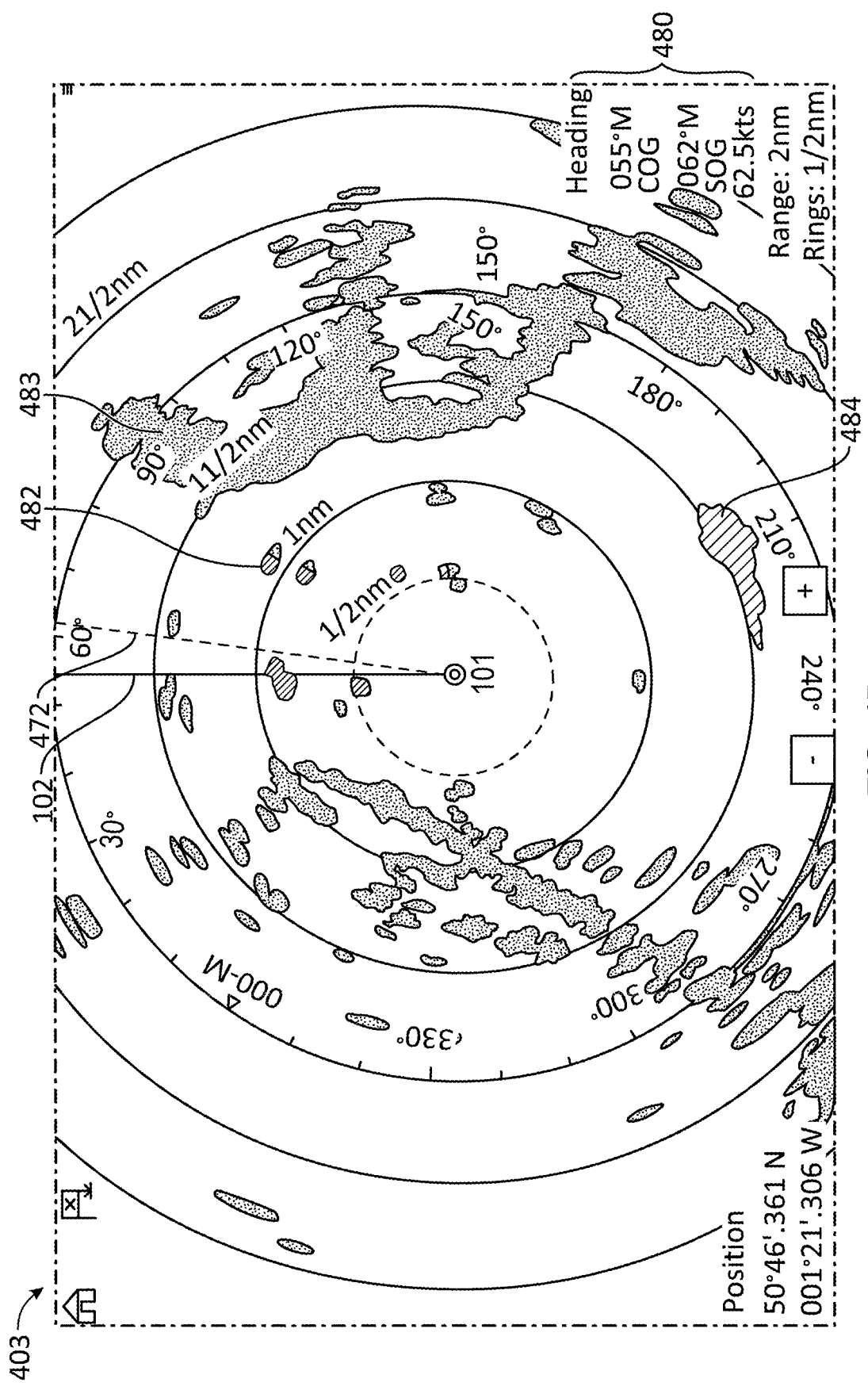
FIGS. 4D-E illustrate display views generated by a remote sensing imagery system in accordance with an embodiment of the disclosure.
Figure 4E:
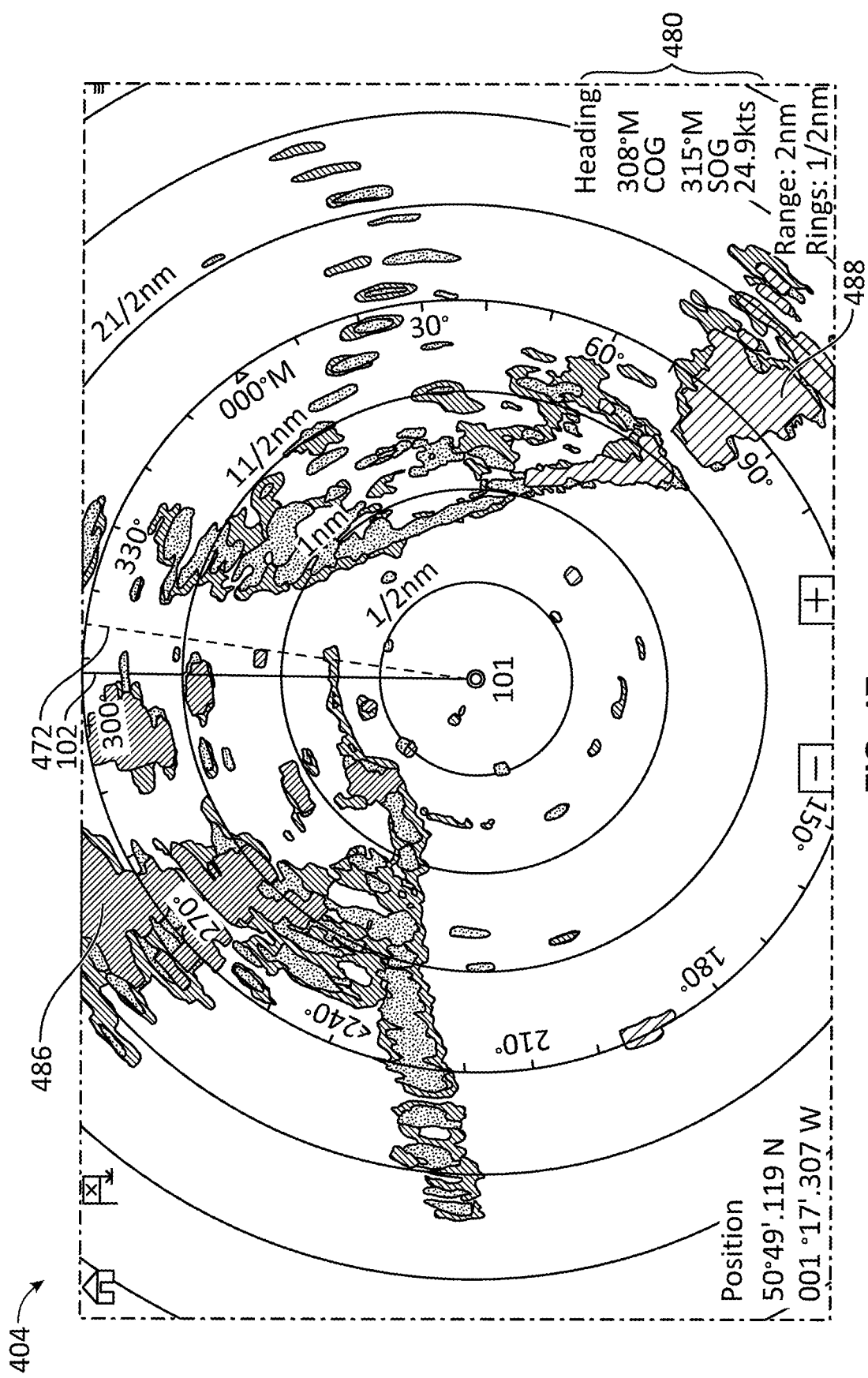

FIGS. 4D-E illustrate display views 403 and 404 generated by remote sensing imagery systems 100, 200, 300, and/or 400 in accordance with an embodiment of the disclosure. In FIG. 4D, display view 403 shows a center graphic identifying a position of mobile structure 101/radar assembly 310 surrounded by radar image data corresponding to a number of detected targets. Also shown are heading 102, COG 472, and corresponding navigation data 480, which includes numerical values for heading 102, COG 472, and an SOG for mobile structure 101. As can be seen in display view 403, a number of targets 482 are shaded red to indicate that they are approaching mobile structure 101 with target radial speeds (e.g., magnitudes) greater than or equal to an applicable target speed threshold. Also, a target 484 is shaded green to indicate that it is receding from mobile structure 101 with a target radial speed (e.g., magnitude) greater than the applicable target speed threshold, and targets 483 are unshaded (e.g., greyscale) to indicate that their corresponding target radial speeds (e.g., magnitudes) are less than the applicable target speed threshold. In various embodiments, systems 100, 200, 300, and/or 400 may be configured to apply any number of different graphics characteristics to differentiate such groupings of targets within display view 403.

In FIG. 4E, display view 404 shows how such shading can become unreliable if the calculation of the target radial speed is more susceptible to noise and/or error in orientation and/or position data (e.g., provided by OPS 190) and/or does not properly compensate for course disturbances (e.g., wind and/or tide). As can be seen in navigational data 480, the SOG of mobile structure 101 is less than half that of the SOG of mobile structure 101 in display view 403, and the corresponding uncorrected heading correction and deceleration of mobile structure 101 (e.g., with concomitant pitch forward about lateral axis 103) has resulted in much of the land mass targets surrounding mobile structure 101 being incorrectly identified as approaching (e.g., targets 486) or receding from (e.g., targets 488) mobile structure 101 with target radial speeds greater than the target speed threshold. Similar motion errors can introduce a corresponding rotational offset error to all radar image data generated by remote sensing imagery system 200, for example, and can cause remote sensing imagery system 200 to miss-identify and/or characterize navigational hazards and/or other targets approaching or receding from mobile structure 101.

Figure 5:
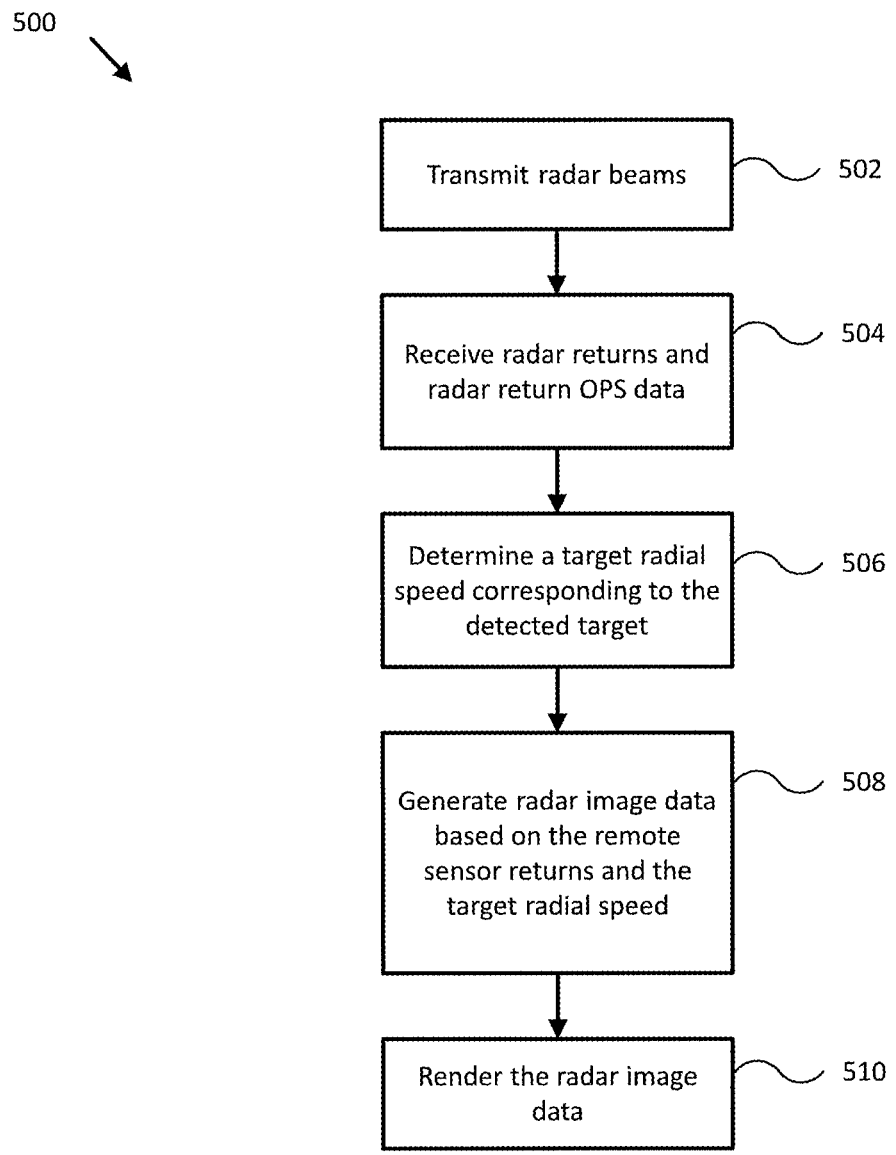
FIG. 5 illustrates a flow diagram of various operations to operate a remote sensing imagery system in accordance with an embodiment of the disclosure.

FIG. 5 illustrates a flow diagram of process 500 to provide remote sensing data and/or imagery for mobile structure 101 in accordance with embodiments of the disclosure. In some embodiments, the operations of FIG. 5 may be implemented as software instructions executed by one or more logic devices associated with corresponding electronic devices, sensors, and/or structures depicted in FIGS. 1A through 4E. More generally, the operations of FIG. 5 may be implemented with any combination of software instructions and/or electronic hardware (e.g., inductors, capacitors, amplifiers, actuators, or other analog and/or digital components).

It should be appreciated that any step, sub-step, sub-process, or block of process 500 may be performed in an order or arrangement different from the embodiments illustrated by FIG. 5. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 500 is described with reference to systems described in FIGS. 1A-4E, process 500 may be performed by other systems different from those systems and including a different selection of electronic devices, sensors, assemblies, mobile structures, and/or mobile structure attributes.

Process 500 represents a method for providing remote sensing data and/or imagery using systems 100, 100B, 200, 300, 302, and/or 400 in accordance with embodiments of the disclosure. At the initiation of process 500, various system parameters may be populated by prior execution of a process similar to process 500, for example, or may be initialized to zero and/or one or more values corresponding to typical, stored, and/or learned values derived from past operation of process 600, as described herein.

In block 502, a logic device transmits remote sensor beams. For example, controller 130 of system 100, controller 220 of system 200, and/or controller 320 of system 300 or 302 may be configured to transmit sonar (acoustic) beams, radar beams, and/or other remote sensor beams from surface 212 using transceiver 234 and sensing element 264. In some embodiments, controllers 130, 220, and/or 320 may be configured to receive sensor transmission orientation and/or position data (e.g., from one or more OPSs 190) corresponding to the transmitted beams, for example, for further processing. In other embodiments, controllers 130, 220, and/or 320 may be configured to receive a desired orientation, position, and/or angular frequency (e.g., an absolute angular frequency) for motion of sensing element 264, as user input from user interface 120 for example, and be configured to control a corresponding actuator (e.g., actuator 316) to adjust the orientation and/or position of sensing element 264 prior to transmitting the remote sensor beams. In such embodiments, controllers 130, 220, and/or 320 may be configured to receive adjusted sensor transmission orientation and/or position data from OPS 190 prior to proceeding to block 504.

In block 504, a logic device receives remote sensor returns corresponding to a detected target. For example, controllers 130, 220, and/or 320 may be configured to receive remote sensor returns from sensing element 264 and/or transceiver 234 (e.g., remote sensing assembly 210) and, in some embodiments, substantially at the same time, receive orientation and/or position data from OPS 190. In some embodiments, controllers 130, 220, and/or 320 may be configured to receive a desired orientation, position, and/or angular frequency from user interface 120 and be configured to control a corresponding actuator (e.g., actuator 316) to adjust the orientation and/or position of sensing element 264 prior to or while receiving the remote sensor returns, then receiving, with the remote sensor returns, adjusted sensor return orientation and/or position data from OPS 190.

In embodiments where remote sensor assembly 210 comprises a radar assembly (e.g., radar assembly 310), actuator 316 may be configured to rotate radar antenna 364 and/or OPS 190 about axis 313 of radar assembly 310 while the remote sensor returns are received by controllers 130, 220, and/or 320. In one such embodiment, controllers 130, 220, and/or 320 may be configured to control actuator 316 to rotate radar antenna 364 and/or OPS 190 according to the desired angular frequency relative to an absolute coordinate frame using absolute sensor return orientation and/or position data provided, at least in part, by OPS 190 (e.g., such as when OPS 190 includes a magnetometer capable of measuring Magnetic North and/or a GNSS compass). In various embodiments, OPS 190 may include one or more of accelerometer/gyroscope 144, GNSS 146, and/or orientation sensor 140 (e.g., a magnetometer, a float level, a compass, and/or other orientation sensing device adapted to measure the orientation and/or position of sensing element 264 during motion of sensing element 264, remote sensor assembly 210, and/or mobile structure 101).

In various embodiments, controllers 130, 220, and/or 320 may be configured to calibrate and/or align the various sensors of OPS 190 by receiving the remote sensor returns and corresponding sensor return orientation and/or position data from OPS 190 during motion of remote sensing assembly 210, sensing element 264, and/or mobile structure 101, and calibrating and/or aligning one or more coordinate frames of the OPS with respect to each other, with respect to an absolute coordinate frame, and/or with respect to a coordinate frame of mobile structure 101, using remote sensor returns and/or the sensor return orientation and/or position data, as described herein. For example, sensors with relatively good long term stability may be used to remove sensor drift in data from sensors with relatively poor long term stability, and sensors with relatively good short term stability maybe used to remove short term errors or transients in data from sensors with relatively poor short term stability. Such calibration processes can occur substantially in parallel with other steps in process 600.

In block 506, a logic device determines a target radial speed corresponding to a detected target. For example, controllers 130, 220, and/or 320 may be configured to determine a target radial speed corresponding to target 464 detected in block 504 based, at least in part, on the radar returns received in block 504 and orientation and/or position data corresponding to the radar returns, radar assembly 310, and/or mobile structure 101 (e.g., provided by one or more OPSs 190).

In some embodiments, controllers 130, 220, and/or 320 may be configured to determine a target radial speed (e.g., singular, across the cross section of the target as presented to radar assembly 310, or plural, as a distribution or spectrum of speeds across the cross section of the target) by determining a Doppler velocity (e.g., velocity and/or velocity spectrum or element of a velocity spectrum) of target 464 based on the radar returns, determining a radial velocity of radar assembly 310 and/or a radar antenna of radar assembly 310, corresponding to the determined Doppler velocity of target 464, based on the orientation and/or position data corresponding to radar assembly 310 and/or mobile structure 101, and determining a difference between the Doppler velocity of target 464 and the radial velocity of radar assembly 310 and/or a radar antenna of radar assembly 310.

In some embodiments, the determining the radial velocity of radar assembly 310 may include determining an absolute velocity of radar assembly 310 based, at least in part, on the orientation and/or position data corresponding to the radar returns received in block 504 and/or radar assembly 310, determining an absolute orientation of antenna 364 of radar assembly 310 based, at least in part, on the orientation and/or position data corresponding to the radar returns received in block 504 and/or radar assembly 310, and determining a component of the absolute velocity of radar assembly 310 in the direction of the absolute orientation of antenna 364 of radar assembly 310 based, at least in part, on the absolute velocity of radar assembly 310 and the absolute orientation of antenna 364 of radar assembly 310.

In block 508, a logic device generates remote sensor image data based on remote sensor returns, target radial speeds, and adaptive target speed thresholds. For example, controllers 130, 220, and/or 320 may be configured to generate remote sensor image data based, at least in part, on the remote sensor returns, target radial speeds, and adaptive target speed thresholds received and/or determined in blocks 604-608. In particular embodiments, the generating the radar image data includes selectively applying a first graphics characteristic (e.g., a shading color or other graphics characteristic) to radar image data corresponding to a detected target when the target radial speed corresponding to the detected target is positive (e.g., receding targets) and greater than or equal to the adaptive target speed threshold determined in block 608, and/or selectively applying a second graphics characteristic to the radar image data corresponding to the detected target when the target radial speed corresponding to the detected target is negative (e.g., approaching targets) and its magnitude is greater than or equal to a target speed threshold, for example.

In embodiments where controllers 130, 220, and/or 320 are configured to control an actuator (e.g., actuator 316) to adjust the orientation and/or position of sensing element 264 (e.g., in blocks 502 and/or 504) prior to or during transmission of remote sensor beams and/or remote sensor returns, controllers 130, 220, and/or 320 may also be configured to generate the remote sensor image data based, at least in part, on the remote sensor returns and adjusted orientation and/or position data received in block 504, and/or on adjusted or unadjusted sensor transmission orientation and/or position data received in block 502.

As in block 504, in various embodiments, controllers 130, 220, and/or 320 may be configured to calibrate and/or align the various sensors of OPS 190 by receiving the remote sensor returns and corresponding sensor return orientation and/or position data from OPS 190 during motion of remote sensing assembly 210, sensing element 264, and/or mobile structure 101. However, such calibration process can now take advantage of the additional remote sensor image data generated in this block 510. Therefore, in some embodiments, controllers 130, 220, and/or 320 may be configured to calibrate and/or align one or more coordinate frames of OPS 190 with respect to each other, with respect to an absolute coordinate frame, and/or with respect to a coordinate frame of mobile structure 101, using remote sensor returns and/or orientation and/or position data, as described herein. As noted in block 504, such calibration processes can occur substantially in parallel with various other steps in process 500 if the various data are available.

In block 510, a logic device renders remote sensor image data. For example, controllers 130, 220, and/or 320 may be configured to render the remote sensor image data generated in block 510 using a display of user interface 120. In some embodiments, the rendered remote sensor image data may be referenced to an absolute coordinate frame (e.g., North-up) and/or a coordinate frame of the mobile structure (e.g., heading or course-up). In various embodiments, controllers 130, 220, and/or 320 may be configured to receive sensing element angle measurements from a sensing element angle sensor (e.g., sensing element angle sensor 317), so as to measure and/or compensate for an offset angle of the remote sensor assembly, for example.

In such embodiments, controllers 130, 220, and/or 320 may be configured to determine the absolute coordinate frame display reference and/or the coordinate frame of the mobile structure display reference (e.g., both of which can require determination of the offset angle) based, at least in part, on the sensing element angle measurements and/or GNSS data provided by OPS 190. For example, in some embodiments, a time series of GNSS data may be used to measure SOG, COG, and/or track for mobile structure 101.

In further embodiments, image data, position data, orientation data, and/or sonar data acquired and/or processed in blocks 502-512 may be used to control operation of mobile structure 101, such as by controlling steering sensor/actuator 150 and/or propulsion system 170 to steer mobile structure 101 according to a desired heading, track, one or more waypoints, a tide or wind effect, and/or other types of user and/or environmental input.

It is contemplated that any one or combination of methods to provide remote sensing imagery may be performed according to one or more operating contexts of a control loop, for example, such as a startup, learning, running, and/or other type operating context. For example, process 500 may proceed back to block 502 and proceed through process 500 again to produce updated remote sensor system imagery, as in a control loop.

Embodiments of the present disclosure can thus provide accurate and reliable remote sensing data and/or imagery. Such embodiments may be used to provide sonar, radar, and/or other remote sensing imagery to assist in navigation for a mobile structure, survey of a body of water, and/or to assist in the operation of other systems, devices, and/or sensors coupled to the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a radar assembly configured to be mounted to a mobile structure, wherein the radar assembly comprises an orientation and position sensor (OPS) coupled to or within the radar assembly and configured to provide orientation and position data associated with the radar assembly; and
a logic device configured to communicate with the radar assembly, wherein the logic device is configured to:
receive radar returns corresponding to a detected target from the radar assembly and orientation and/or position data corresponding to the radar returns from the OPS;
determine a target radial speed corresponding to the detected target based, at least in part, on the radar returns and the orientation and/or position data corresponding to the radar assembly; and
generate radar image data based, at least in part, on the radar returns and the target radial speed.

2. The system of claim 1, wherein the determining the target radial speed comprises:
determining a Doppler velocity of the target based, at least in part, on the radar returns;
determining a radial velocity of the radar assembly, corresponding to the determined Doppler velocity of the target, based on the orientation and/or position data corresponding to the radar assembly; and
determining a difference between the Doppler velocity of the target and the radial velocity of the radar assembly.

3. The system of claim 2, wherein the determining the radial velocity of the radar assembly comprises:
determining an absolute velocity of the radar assembly based, at least in part, on the orientation and/or position data corresponding to the radar assembly;
determining an absolute orientation of an antenna of the radar assembly based, at least in part, on the orientation and/or position data corresponding to the radar assembly; and
determining a component of the absolute velocity of the radar assembly in the direction of the absolute orientation of the antenna of the radar assembly based, at least in part, on the absolute velocity of the radar assembly and the absolute orientation of an antenna of the radar assembly.

4. The system of claim 1, wherein the generating the radar image data comprises selectively applying:
a first graphics characteristic to the radar image data corresponding to the detected target when the target radial speed corresponding to the detected target is positive and greater than or equal to the target speed threshold; and/or
a second graphics characteristic to the radar image data corresponding to the detected target when the target radial speed corresponding to the detected target is negative and its magnitude is greater than or equal to the target speed threshold.

5. The system of claim 1, wherein the OPS comprises:
a gyroscope and/or accelerometer coupled to an antenna platform of the radar assembly and disposed at or adjacent to a rotational axis of the radar assembly; and
a global navigation satellite system receiver coupled to the antenna platform of the radar assembly and disposed at least a partial baseline length from the rotational axis of the radar assembly.

6. The system of claim 1, wherein the OPS comprises:
a first global navigation satellite system receiver coupled to an antenna platform of the radar assembly and disposed at or adjacent to a rotational axis of the radar assembly; and
a second global navigation satellite system receiver coupled to the antenna platform of the radar assembly and disposed a baseline length from the first global navigation satellite system receiver.

7. The system of claim 1, wherein the OPS comprises one or more of an accelerometer, a gyroscope, a magnetometer, a float level, and/or a compass adapted to measure the orientation and/or position of the radar assembly and/or a radar antenna of the radar assembly during motion of the radar assembly, the radar antenna, and/or the mobile structure, the system further comprising:
an actuator configured to communicate with the logic device and configured to adjust an orientation and/or position of a radar antenna of the radar assembly, wherein:
the mobile structure comprises a watercraft; and
the logic device is configured to control the actuator to rotate the radar antenna about an axis of the radar assembly while the radar returns are received by the logic device and according to a desired angular frequency and/or absolute orientation for the radar antenna and/or the radar assembly.

8. The system of claim 1, further comprising a display configured to communicate with the logic device, wherein the logic device is configured to:
render the radar image data using the display, wherein the rendered radar image data is referenced to an absolute coordinate frame and/or a coordinate frame of the mobile structure.

9. The system of claim 8, further comprising a radar antenna angle sensor physically coupled to the radar assembly and configured to measure an angle between an orientation of the radar antenna and a longitudinal axis of the housing and/or the mobile structure, wherein the logic device is configured to:
receive radar antenna angle measurements from the radar antenna angle sensor; and
determine the absolute coordinate frame display reference and/or the coordinate frame of the mobile structure display reference based, at least in part, on the radar antenna angle measurements and/or GNSS data provided by the OPS.

10. The system of claim 1, wherein the logic device is configured to:
receive the radar returns and the corresponding orientation and/or position data from the OPS during motion of the radar assembly, a radar antenna of the radar assembly, and/or the mobile structure; and
calibrate one or more coordinate frames of the OPS with respect to each other, with respect to an absolute coordinate frame, and/or with respect to a coordinate frame of the mobile structure, using the radar image data, the radar returns, and/or the orientation and/or position data.

11. A method comprising:
receiving radar returns corresponding to a detected target from a radar assembly configured to be mounted to a mobile structure;
receiving orientation and/or position data corresponding to the radar returns from an orientation and position sensor (OPS) coupled to or within the radar assembly;
determining a target radial speed corresponding to the detected target based, at least in part, on the radar returns and the orientation and/or position data corresponding to the radar assembly; and
generating radar image data based, at least in part, on the radar returns and the target radial speed.

12. The method of claim 11, wherein the determining the target radial speed comprises:
determining a Doppler velocity of the target based, at least in part, on the radar returns;
determining a radial velocity of the radar assembly, corresponding to the determined Doppler velocity of the target, based on the orientation and/or position data corresponding to the radar assembly; and
determining a difference between the Doppler velocity of the target and the radial velocity of the radar assembly.

13. The method of claim 12, wherein the determining the radial velocity of the radar assembly comprises:
determining an absolute velocity of the radar assembly based, at least in part, on the orientation and/or position data corresponding to the radar assembly;
determining an absolute orientation of an antenna of the radar assembly based, at least in part, on the orientation and/or position data corresponding to the radar assembly; and
determining a component of the absolute velocity of the radar assembly in the direction of the absolute orientation of the antenna of the radar assembly based, at least in part, on the absolute velocity of the radar assembly and the absolute orientation of an antenna of the radar assembly.

14. The method of claim 11, wherein the generating the radar image data comprises selectively applying:
a first graphics characteristic to the radar image data corresponding to the detected target when the target radial speed corresponding to the detected target is positive and greater than or equal to the target speed threshold; and/or
a second graphics characteristic to the radar image data corresponding to the detected target when the target radial speed corresponding to the detected target is negative and its magnitude is greater than or equal to the target speed threshold.

15. The method of claim 11, wherein the OPS comprises:
a gyroscope and/or accelerometer coupled to an antenna platform of the radar assembly and disposed at or adjacent to a rotational axis of the radar assembly; and
a global navigation satellite system receiver coupled to the antenna platform of the radar assembly and disposed at least a partial baseline length from the rotational axis of the radar assembly.

16. The method of claim 11, wherein the OPS comprises:
a first global navigation satellite system receiver coupled to an antenna platform of the radar assembly and disposed at or adjacent to a rotational axis of the radar assembly; and
a second global navigation satellite system receiver coupled to the antenna platform of the radar assembly and disposed a baseline length from the first global navigation satellite system receiver.

17. The method of claim 11, further comprising:
controlling an actuator configured to adjust an orientation and/or position of a radar antenna of the radar assembly to rotate the radar antenna about an axis of the radar assembly while the radar returns are received and according to a desired angular frequency and/or absolute orientation for the radar antenna and/or the radar assembly.

18. The method of claim 11, further comprising:
rendering the radar image data via a display, wherein the rendered radar image data is referenced to an absolute coordinate frame and/or a coordinate frame of the mobile structure.

19. The method of claim 18, further comprising:
receiving radar antenna angle measurements from a radar antenna angle sensor physically coupled to the radar assembly and configured to measure an angle between an orientation of the radar antenna and a longitudinal axis of the housing and/or the mobile structure; and
determining the absolute coordinate frame display reference and/or the coordinate frame of the mobile structure display reference based, at least in part, on the radar antenna angle measurements and/or GNSS data provided by the OPS.

20. The method of claim 11, further comprising:
receiving the radar returns and the corresponding orientation and/or position data from the OPS during motion of the radar assembly, a radar antenna of the radar assembly, and/or the mobile structure; and
calibrating one or more coordinate frames of the OPS with respect to each other, with respect to an absolute coordinate frame, and/or with respect to a coordinate frame of the mobile structure, using the radar image data, the radar returns, and/or the orientation and/or position data.

* * * * *

UNITED STATES PATENT AND TRADEMARK OFFICE
CERTIFICATE OF CORRECTION

| | | |
|---|---|---|
| PATENT NO. | : 12,392,887 B2 | Page 1 of 1 |
| APPLICATION NO. | : 18/166424 | |
| DATED | : August 19, 2025 | |
| INVENTOR(S) | : Richard James Jales and Philip Webb | |

It is certified that error appears in the above-identified patent and that said Letters Patent is hereby corrected as shown below:

In the Specification

Column 1, Lines 15-16, change "U.S. patent application Ser. No." to --U.S. Patent Application No.--.

Signed and Sealed this
Ninth Day of December, 2025

John A. Squires
*Director of the United States Patent and Trademark Office*